US012447010B2

(12) United States Patent
Vidlund et al.

(10) Patent No.: US 12,447,010 B2
(45) Date of Patent: Oct. 21, 2025

(54) COLLAPSIBLE GASKET SEAL FOR HEART VALVE

(71) Applicant: Cephea Valve Technologies, Inc., Santa Clara, CA (US)

(72) Inventors: Zachary R. Vidlund, Robbinsdale, MN (US); Spencer Noe, San Miguel, CA (US); Randolf Von Oepen, Aptos, CA (US)

(73) Assignee: Cephea Valve Technologies, Inc., Abbott Park, IL (US)

( * ) Notice: Subject to any disclaimer, the term of this patent is extended or adjusted under 35 U.S.C. 154(b) by 374 days.

(21) Appl. No.: 17/548,984

(22) Filed: Dec. 13, 2021

(65) Prior Publication Data

US 2022/0192824 A1 Jun. 23, 2022

Related U.S. Application Data

(60) Provisional application No. 63/127,311, filed on Dec. 18, 2020.

(51) Int. Cl.
*A61F 2/24* (2006.01)

(52) U.S. Cl.
CPC .......... *A61F 2/2409* (2013.01); *A61F 2/2418* (2013.01); *A61F 2220/0008* (2013.01); *A61F 2250/0003* (2013.01); *A61F 2250/001* (2013.01)

(58) Field of Classification Search
CPC .... A61F 2/2418; A61F 2/2409; A61F 2/2427; A61F 2/07; A61F 2/24; A61F 2/82; A61F 2/246; A61F 2/86
See application file for complete search history.

(56) References Cited

U.S. PATENT DOCUMENTS

| 8,652,203 | B2 * | 2/2014 | Quadri | A61F 2/2427 |
| | | | | 623/2.11 |
| 8,986,375 | B2 * | 3/2015 | Garde | A61F 2/2412 |
| | | | | 623/2.38 |
| 9,668,858 | B2 | 6/2017 | Morin et al. | |
| 10,188,514 | B2 * | 1/2019 | Nasr | A61F 2/2418 |

(Continued)

FOREIGN PATENT DOCUMENTS

| WO | WO-2014022124 A1 * | 2/2014 | ........... A61F 2/2439 |
| WO | WO-2023249883 A1 * | 12/2023 | ........... A61F 2/2436 |

*Primary Examiner* — Seema Mathew
(74) *Attorney, Agent, or Firm* — SLEMAN & LUND LLP

(57) ABSTRACT

A prosthetic mitral valve includes a stent frame and an anchor assembly coupled to and peripherally surrounding the stent frame. The anchor assembly includes atrial anchors on the inflow end, ventricular anchors on the outflow end, and a central waist portion disposed therebetween. The anchor assembly generally defines an hourglass shape wherein the atrial and ventricular anchors flare radially outward and the central waist portion has a relatively smaller diameter. The prosthetic valve may include a gasket disposed peripherally around the central waist portion to seal the space between the body of the valve and the native valve annulus to prevent paravalvular leakage without increasing the profile of the valve to allow for smooth insertion into and deployment from a delivery device. The prosthetic valve may alternatively include a sealing fabric surrounding the anchor assembly defining a radial protrusion around the central waist portion to seal the native annulus.

16 Claims, 12 Drawing Sheets

(56) References Cited

U.S. PATENT DOCUMENTS

| | | | |
|---|---|---|---|
| 11,202,704 B2* | 12/2021 | Morriss | A61F 2/2433 |
| 11,523,900 B2* | 12/2022 | Morriss | A61F 2/2457 |
| 11,813,162 B2* | 11/2023 | Braido | A61F 2/2418 |
| 2004/0236411 A1* | 11/2004 | Sarac | A61L 27/3641 |
| | | | 623/2.14 |
| 2006/0287717 A1* | 12/2006 | Rowe | A61F 2/2445 |
| | | | 623/2.11 |
| 2009/0030499 A1* | 1/2009 | Bebb | A61F 2/07 |
| | | | 623/1.13 |
| 2010/0114305 A1* | 5/2010 | Kang | A61F 2/2418 |
| | | | 623/1.26 |
| 2010/0145438 A1* | 6/2010 | Barone | A61F 2/2418 |
| | | | 623/2.38 |
| 2010/0168844 A1* | 7/2010 | Toomes | A61F 2/2418 |
| | | | 623/2.18 |
| 2011/0098802 A1* | 4/2011 | Braido | A61F 2/243 |
| | | | 623/2.11 |
| 2011/0282439 A1* | 11/2011 | Thill | A61F 2/95 |
| | | | 623/2.17 |
| 2011/0313515 A1* | 12/2011 | Quadri | A61F 2/2418 |
| | | | 623/2.22 |
| 2012/0078360 A1* | 3/2012 | Rafiee | A61F 2/2418 |
| | | | 623/2.37 |
| 2012/0215303 A1* | 8/2012 | Quadri | A61F 2/2418 |
| | | | 623/2.18 |
| 2013/0331929 A1* | 12/2013 | Mitra | A61F 2/2418 |
| | | | 623/2.11 |
| 2014/0236287 A1* | 8/2014 | Clague | A61F 2/2418 |
| | | | 623/2.11 |
| 2014/0236291 A1* | 8/2014 | Schweich, Jr. | A61F 2/243 |
| | | | 623/2.36 |
| 2014/0277410 A1* | 9/2014 | Bortlein | A61F 2/2418 |
| | | | 623/2.11 |
| 2014/0277411 A1 | 9/2014 | Börtlein | |
| 2014/0277412 A1* | 9/2014 | Bortlein | A61F 2/2418 |
| | | | 623/2.11 |
| 2014/0277417 A1* | 9/2014 | Schraut | A61F 2/2418 |
| | | | 623/2.17 |
| 2014/0296975 A1* | 10/2014 | Tegels | A61F 2/07 |
| | | | 623/2.18 |
| 2015/0327996 A1* | 11/2015 | Fahim | A61F 2/2412 |
| | | | 623/2.17 |
| 2015/0328000 A1* | 11/2015 | Ratz | A61F 2/2445 |
| | | | 623/2.37 |
| 2017/0189174 A1* | 7/2017 | Braido | A61F 2/2436 |
| 2017/0325945 A1* | 11/2017 | Dale | A61F 2/2412 |
| 2017/0325948 A1* | 11/2017 | Wallace | A61F 2/2409 |
| 2018/0055629 A1* | 3/2018 | Oba | A61F 2/2409 |
| 2018/0125649 A1* | 5/2018 | Nasr | A61F 2/2415 |
| 2018/0360600 A1 | 12/2018 | Zhuang | |
| 2019/0029811 A1* | 1/2019 | Bishop | A61F 2/2436 |
| 2019/0099265 A1* | 4/2019 | Braido | A61F 2/86 |
| 2019/0105154 A1* | 4/2019 | Cohen-Tzemach | A61F 2/2418 |
| 2019/0328525 A1 | 10/2019 | Noe et al. | |
| 2020/0000579 A1 | 1/2020 | Manash | |
| 2020/0113683 A1* | 4/2020 | Dale | A61F 2/2418 |
| 2020/0121454 A1* | 4/2020 | Spence | A61F 2/2454 |
| 2020/0246140 A1* | 8/2020 | Hariton | A61F 2/2415 |
| 2020/0289261 A1* | 9/2020 | Qi | A61F 2/2418 |
| 2022/0192824 A1* | 6/2022 | Vidlund | A61F 2/2418 |
| 2023/0277307 A1* | 9/2023 | Noe | A61F 2/2439 |
| | | | 623/2.18 |
| 2023/0390052 A1* | 12/2023 | Okafor | A61F 2/2418 |
| 2024/0307177 A1* | 9/2024 | Levi | A61F 2/2412 |

\* cited by examiner

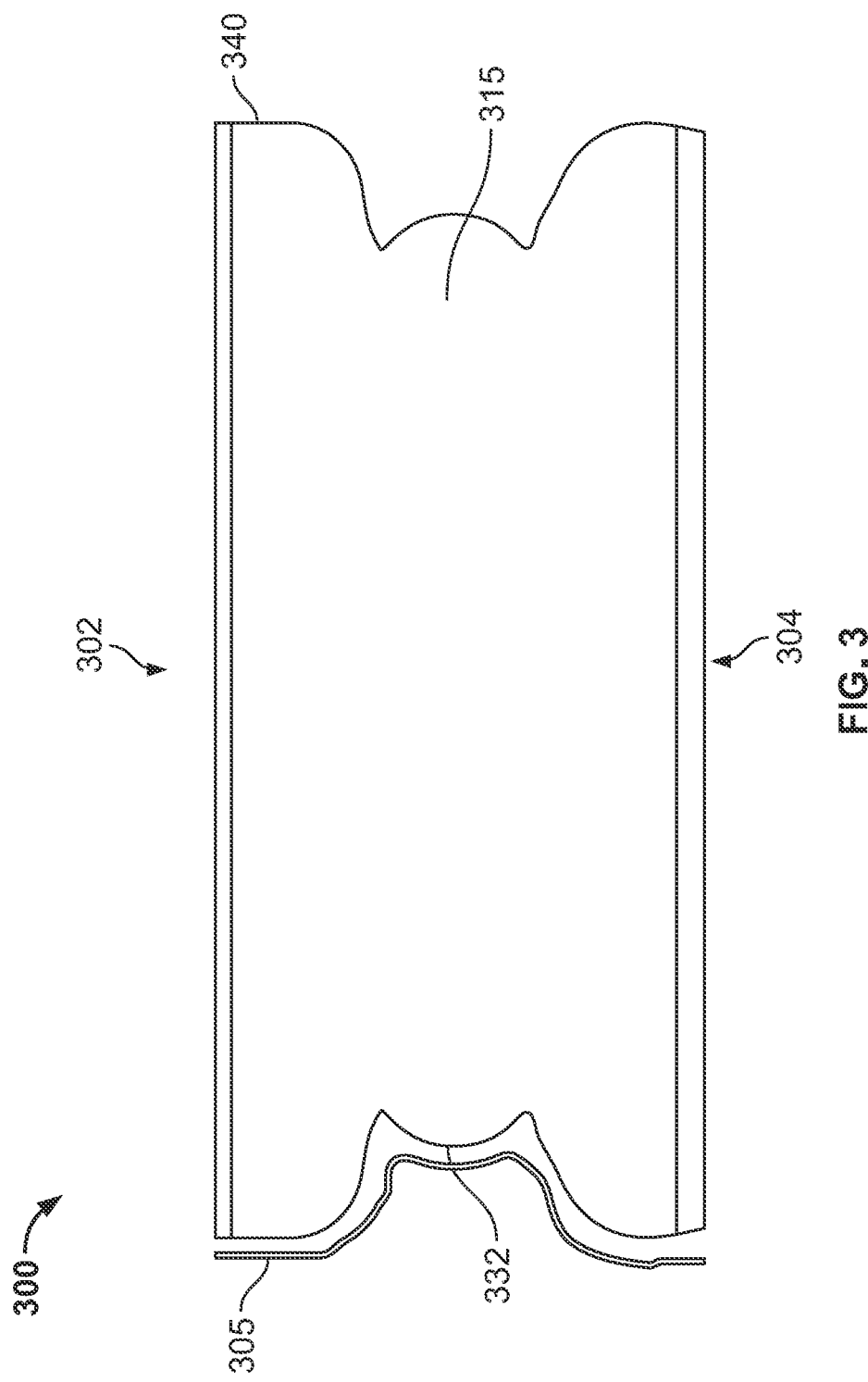

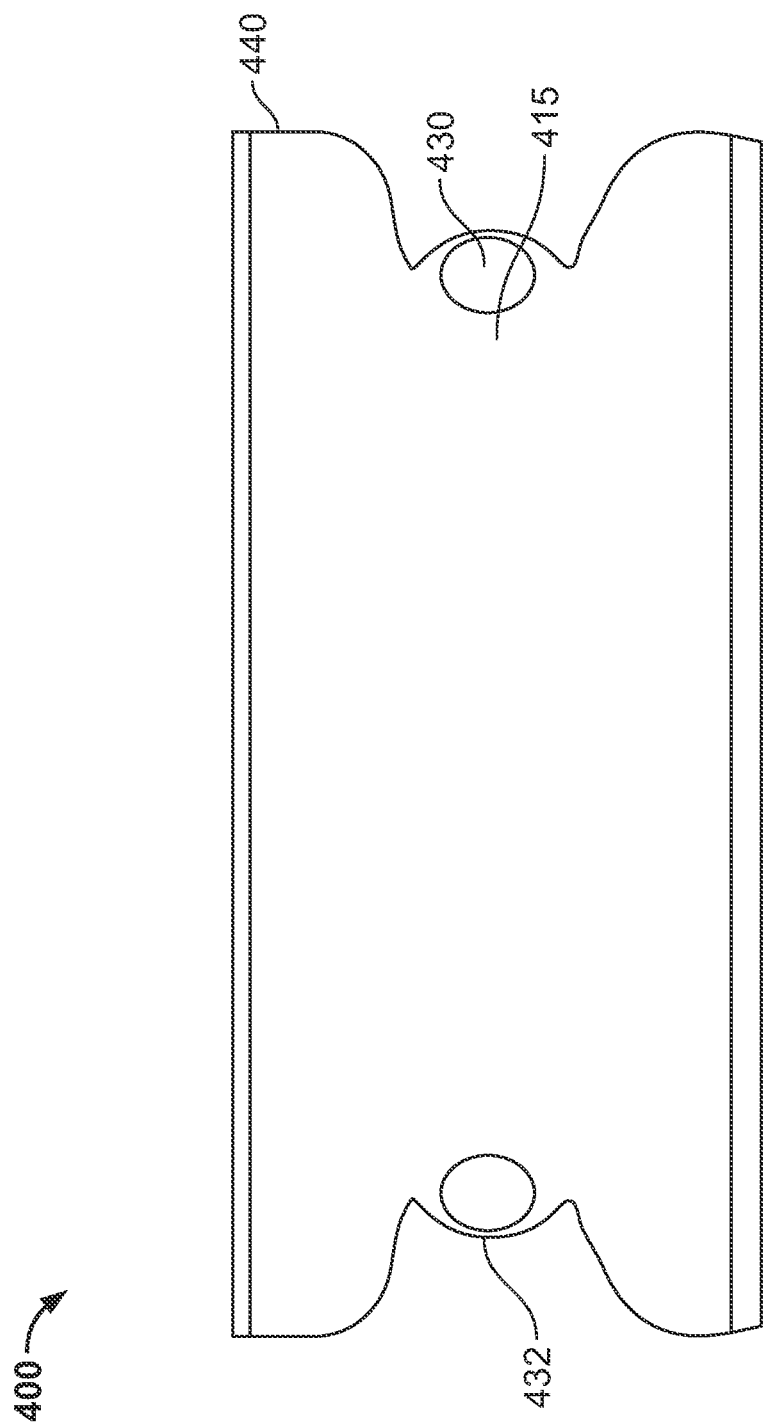

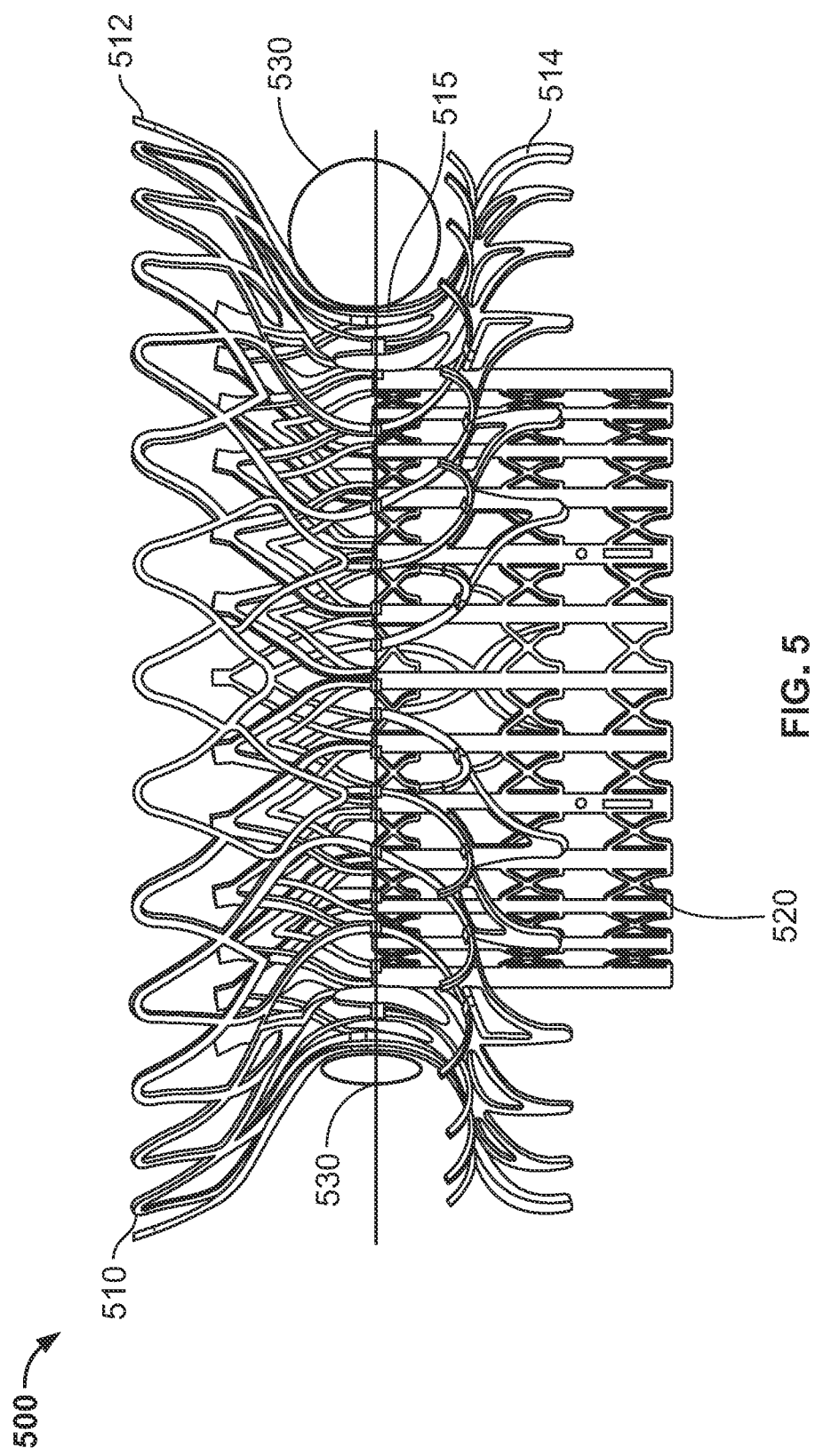

COLLAPSIBLE GASKET SEAL FOR HEART VALVE

BACKGROUND OF THE DISCLOSURE

The mitral valve lies between the left atrium and the left ventricle of the heart. Various diseases can affect the function of the mitral valve, including degenerative mitral valve disease and mitral valve prolapse. These diseases can cause mitral stenosis, in which the valve fails to open fully and thereby obstructs blood flow, and/or mitral insufficiency, in which the mitral valve in incompetent and blood flows passively in the wrong direction.

A heart valve must seal blood from flowing backward through the annulus. This backward flow is called regurgitation. One sub-set of this regurgitation is paravalvular regurgitation, or paravalvular leakage ("PVL"). PVL is a major problem with percutaneous implantable valves and is associated with significant risk for the patient. Studies have shown that the mortality of patients who have PVL after implantation of a mitral or aortic valve will significantly increase. For a mitral valve, the native annulus is highly variable, and is often described as having a saddle (or hyperbolic paraboloid) shape. When deploying a circular valve, sealing the native mitral valve to prevent PVL can be difficult.

Another problem facing heart valve devices is delivery system profile. Delivery system profile is characterized by radial size, particularly when in the collapsed condition, with smaller sizes being desirable for safely navigating through small vessels. In other words, if a prosthetic heart valve can be collapsed to a smaller size, a delivery device used to deliver the prosthetic heart valve can have a correspondingly smaller size, which is generally desirable to allow for easier and safer passage of the delivery device through the vasculature.

Accordingly, methods and devices for preventing PVL while minimizing delivery profile are desirable.

BRIEF SUMMARY OF THE DISCLOSURE

To avoid or minimize PVL, it is important to minimize or eliminate spaces which are difficult to seal. The prosthetic valve disclosed herein, which may be adapted for use in at least a mitral valve or a tricuspid valve, generally has an anchor with an hourglass shape including atrial anchors on the inflow end and ventricular anchors on the outflow end with a narrow central waist portion therebetween. The central waist portion may be disposed, for example, in the native mitral valve annulus and have a smaller diameter than the anchors, and the anchors may have larger diameters than the central waist portion and flare outward to pinch the native valve annulus. The prosthetic mitral heart valve described herein may include a collapsible tube that can be sewn (or otherwise attached) to the outside of a valve anchor that, when loaded into a catheter, lays substantially flat to minimize packing profile, and when deployed, radially expands to maximize sealing of the valve against PVL where the body of the valve anchor may not be pressed against the native tissue, for example due to under sizing or irregular shapes of the native annulus.

Also disclosed herein is a prosthetic valve having a sealing fabric shaped to include a radial protrusion from a central waist portion of the fabric to seal the space between the body of the valve anchor and the native mitral annulus to prevent PVL. To seal more effectively, a collapsible or inflatable member may be attached to the groove of the valve either outside of, or underneath, the sealing fabric.

According to a first aspect of the disclosure, a prosthetic heart valve includes an inner stent frame, an outer anchor assembly, a gasket and a plurality of prosthetic leaflets. The inner stent frame may be configured to expand from a collapsed configuration to an expanded configuration. The outer anchor assembly may be coupled to and disposed radially outward of the inner stent frame. The outer anchor assembly may be configured to expand from a collapsed configuration to an expanded configuration. The outer anchor assembly may include an atrial anchor at an inflow end of the prosthetic heart valve. The outer anchor assembly may further include a ventricular anchor at an outflow end of the prosthetic heart valve. The outer anchor assembly may further include a central waist portion disposed between the atrial and ventricular anchors. In an expanded configuration of the outer anchor assembly, the central waist portion may have a diameter smaller than a diameter of the atrial anchor and a diameter of the ventricular anchor. The gasket may surround an outer circumference of the central waist portion. The gasket may be configured to seal a space between the prosthetic mitral valve and surrounding tissue of a native valve annulus when the prosthetic heart valve is implanted in the native valve annulus. The gasket may not extend radially beyond an outer surface of the atrial anchor nor an outer surface of the ventricular anchor when the prosthetic heart valve is maintained in a collapsed state within a delivery device. The plurality of prosthetic leaflets may be coupled to an inner circumference of the inner stent frame. The plurality of prosthetic leaflets may be adapted to allow unidirectional flow of blood through the prosthetic heart valve.

According to another aspect of the disclosure, a prosthetic heart valve includes an inner stent frame, an outer anchor assembly, an outer skirt and a plurality of leaflets. The inner stent frame may be configured to expand from a collapsed configuration to an expanded configuration. The outer anchor assembly may be coupled to and disposed radially outward of the inner stent frame. The outer anchor assembly may be configured to expand from a collapsed configuration to an expanded configuration. The outer anchor assembly may include an atrial anchor at an inflow end of the prosthetic heart valve. The outer anchor assembly may further include a ventricular end at outflow end of the prosthetic heart valve. The outer anchor assembly may further include a central waist portion disposed between the atrial and ventricular anchors. In the expanded configuration of the outer anchor assembly, the central waist portion may be concave along an outer surface of the outer anchor assembly. The outer skirt may be disposed radially outward of the outer anchor assembly. In the expanded configuration of the outer anchor assembly, the outer skirt may include a convex protrusion around an outer surface of the outer skirt. The convex protrusion may axially align with the concave central waist portion of the outer anchor assembly. The plurality of prosthetic leaflets may be coupled to an inner circumference of the inner stent frame. The plurality of prosthetic leaflets may be adapted to allow unidirectional flow of blood through the prosthetic heart valve.

BRIEF DESCRIPTION OF THE DRAWINGS

FIG. 3 is a front view of a prosthetic mitral valve according to another embodiment of the disclosure.

FIG. 3AA' is a front view of a portion of a prosthetic heart valve overlaid on a silhouette of an outer skirt.

FIG. 3AB is a front view of the prosthetic mitral valve portion of FIG. 3AA with a rounded protrusion formed in the outer skirt.

FIG. 3AB' is a front view of a portion of a prosthetic heart valve overlaid on a silhouette of an outer skirt having a rounded protrusion.

FIGS. 3AC-3AD are front and perspective views, respectively, of the prosthetic mitral valve of FIG. 3AB.

FIG. 3AE is a front view of a prosthetic heart valve covered by an outer skirt according to another embodiment of the disclosure.

FIG. 3BB is a front view of the prosthetic mitral valve portion of FIG. 3BA with a rounded protrusion formed in the outer skirt.

FIG. 4 is a front view of a prosthetic mitral valve according to another embodiment of the disclosure showing a cross-sectional view of the attached wire.

FIG. 5 is a front view of a prosthetic mitral valve according to another embodiment of the disclosure.

DETAILED DESCRIPTION

This disclosure includes replacement heart valves, also referred to herein as prosthetic heart valves. As used herein, the term "inflow end" when used in connection with a prosthetic heart valve refers to the end of the prosthetic valve into which blood first enters when the prosthetic valve is implanted in an intended position and orientation, while the term "outflow end" refers to the end of the prosthetic valve where blood exits when the prosthetic valve is implanted in the intended position and orientation. Thus, for a prosthetic mitral valve, the inflow end is the end nearer the left atrium while the outflow end is the end nearer the left ventricle. The intended position and orientation are used for the convenience of describing the valve disclosed herein, however, it should be noted that the use of the valve is not limited to the intended position and orientation, but may be deployed in any type of lumen or passageway. For example, although the prosthetic heart valve is described herein as a prosthetic mitral valve, the same or similar structures and features can be employed in other heart valves, such as the pulmonary valve, the aortic valve, or the tricuspid valve. As used herein, the terms "substantially," "generally," "approximately," and "about" are intended to mean that slight deviations from absolute are included within the scope of the term so modified. As used herein, the valve may assume an "expanded state" and a "collapsed state," which refer to the relative radial size of the stent.

The replacement heart valves described herein may be delivered to a cardiac valve annulus, such as the mitral valve, by using minimally invasive techniques to access the cardiac valve. In some embodiments, the mitral valve prosthesis can be delivered through a transapical route, i.e., by making a small incision in the patient's body and passing the prosthesis through the apex of the heart to, for example, the mitral valve. In other embodiments, the mitral valve prosthesis can be delivered through a transseptal route, i.e., through the venous system to the right atrium, and then into the left atrium via a transseptal puncture. However, it should be understood that the disclosure described herein may be applicable to prosthetic heart valves regardless of the implantation route.

Figure 1:
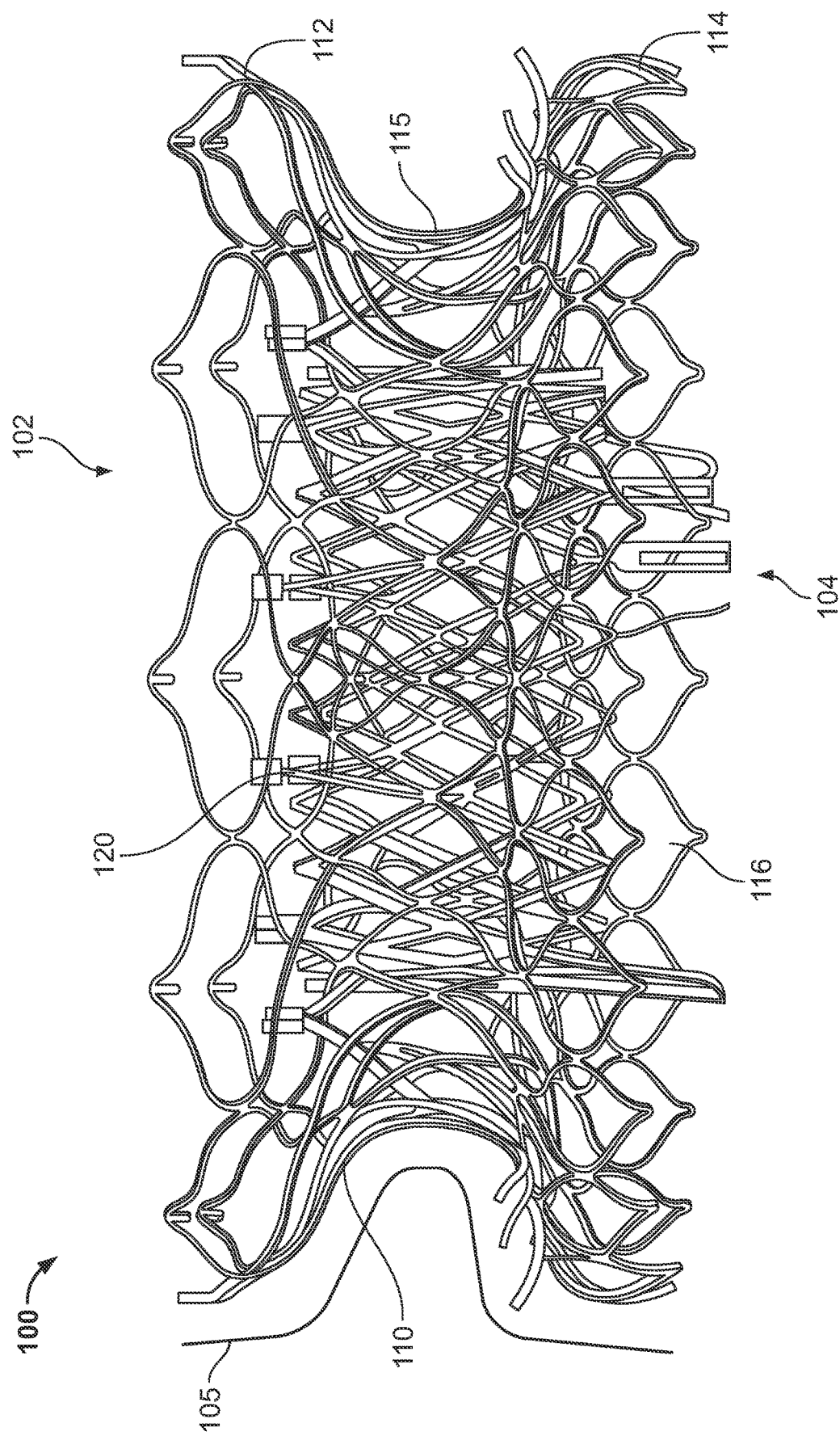
FIG. 1 is a front view of a prosthetic mitral valve according to an embodiment of the disclosure.

FIG. 1 shows an exemplary prosthetic mitral valve 100 in an expanded state. The portion of the valve 100 in FIG. 1 may be referred to as a prosthesis subassembly, which includes an anchor assembly 110 (which may also be referred to as an outer frame or outer stent) and a strut frame 120 (which may also be referred to as an inner frame or inner stent), but excludes prosthetic leaflets and any skirts that may be incorporated into the final prosthetic valve. The anchor assembly 110 includes an atrial anchor 112, a ventricular anchor 114, and a central waist portion 115 therebetween. In this embodiment, the atrial anchor 112 is configured and adapted to be disposed on an inflow end 102 of the valve 100 and an atrial side of a mitral valve annulus, and ventricular anchor 114 is configured and adapted to be disposed on an outflow end 104 of the valve 100 and a ventricular side of the mitral valve annulus. Further, the central waist portion 115 may be configured to be situated in the native mitral valve annulus. The central waist portion 115 may have a diameter that fits approximately within the native mitral valve annulus, although the waist diameter may be slightly greater or slightly smaller than the native annulus, resulting in slight oversizing or slight undersizing. In some embodiments, the anchor assembly 110 and/or strut frame 120 may be made of wire, such as a shape memory metal wire (e.g., nitinol). In other embodiments, the anchor assembly 110 and/or strut frame 120 may be laser cut from one or more tubes, such as a shape memory metal tube (e.g., nitinol).

The prosthetic mitral valve 100 may be configured to expand (e.g., self-expand) from a collapsed or constrained (also referred to as "delivery") state to an expanded or unconstrained (also referred to as "treatment" or "deployed") state. In the expanded state shown in FIG. 1, the atrial anchor 112 and the ventricular anchor 114 extend radially outward from the central waist portion 115. The valve 100 is configured to be secured in the native valve annulus by sandwiching or clamping the native valve annulus between the atrial anchor 112 and the ventricular anchor 114, which are larger in diameter than the valve annulus, by applying an axial compressive force from the anchors, a radial force from the central waist portion 115 outward against the annulus, and/or by using hooks or barbs on the anchors 112, 114 that extend into the surrounding tissue.

The anchor assembly 110 may be configured to expand circumferentially and foreshorten axially as the valve 100 expands from the collapsed delivery state to the expanded treatment state. For example, as shown in FIG. 1, the anchor assembly 110 may be made of a plurality of cells 116 that allow the anchor assembly 110 to expand circumferentially and foreshorten axially. The cells 116 may form any shape that allows the anchor assembly 110 to transition between a collapsed state and an expanded state, such as clover-shaped, diamond-shaped, or the like. The primary purpose of the anchor assembly 110 may be to physically maintain the prosthetic heart valve 100 in a desired position and orientation within the native heart valve.

The strut frame 120 may extend axially beyond the ventricular anchors 114 and is configured for attaching a plurality of prosthetic leaflets thereto to control blood flow therethrough. However, it should be understood that the distance which the strut frame 120 extends beyond the ventricular anchors 114 may vary, and in some embodiments the strut frame 120 need not extend axially beyond the ventricular anchors 114. The strut frame 120 may be configured to expand circumferentially. Depending on the particular configuration of the strut frame 120, the strut frame may be configured to be either foreshortening or non-foreshortening. For example, the inner strut frame 120 illustrated in FIG. 1 includes a plurality of diamond-shaped cells in various rows, and is configured to foreshorten upon expansion. But in other embodiments, the inner strut frame may include a plurality of longitudinally extending struts (as shown, for example, by the valve 500 in FIG. 5) which allow the inner strut frame to maintain substantially the same axial dimension (i.e., be non-foreshortening) as the valve expands from the collapsed delivery state to the expanded treatment state. By being non-foreshortening, the inner strut frame may result in less strain being placed on the leaflets during delivery and/or loading. However, as noted above, the inner strut frame 120 can be either foreshortening or non-foreshortening. Thus, the anchor assembly 110 is designed to be foreshortening while the strut frame 120 can be designed to be either foreshortening or non-foreshortening. The strut frame 120 may be secured to at least one of the central waist portion 115, the atrial anchor 112 or the ventricular anchor 114. The strut frame 120 and anchor assembly 110 may be coupled together with coupling members, such as rivets, sutures, or other mechanical fasteners. In the illustrated embodiments, the strut frame 120 and anchor assembly 110 each have coupling arms that are generally coupled together at or near the atrial or inflow end of the prosthetic heart valve 100, although other locations may be suitable. In some embodiments, the valve 100 may include hooks or barbs to help anchor the assembly in the native valve annulus. Various embodiments of the valve are described in greater detail in U.S. Pat. Publ. No. 2019/0328525, which is herein incorporated by reference.

As illustrated in FIG. 1, the flared configuration of the anchors 112, 114 in conjunction with the central waist portion 115 define a generally hourglass shape in a front view of the anchor assembly 110, when the anchor assembly 110 is in the expanded condition. That is, the anchors 112, 114 are flared radially outwards relative to the central waist portion 115 and then curved or bent to point at least partially back in the axial direction, such that in the front view of the anchor assembly 110, such as in FIG. 1, the central waist portion 115 generally forms a C-shape between the atrial anchors 112 and the ventricular anchors 114. It should be understood, however, that this configuration is not limited to a symmetrical configuration. The anchor assembly 110 defines a longitudinal contour length 105 which is defined as the length extending from the inflow end 102 to the outflow end 104 of the anchor assembly 110 following the outer surface profile of the anchor assembly 110.

Figure 2:
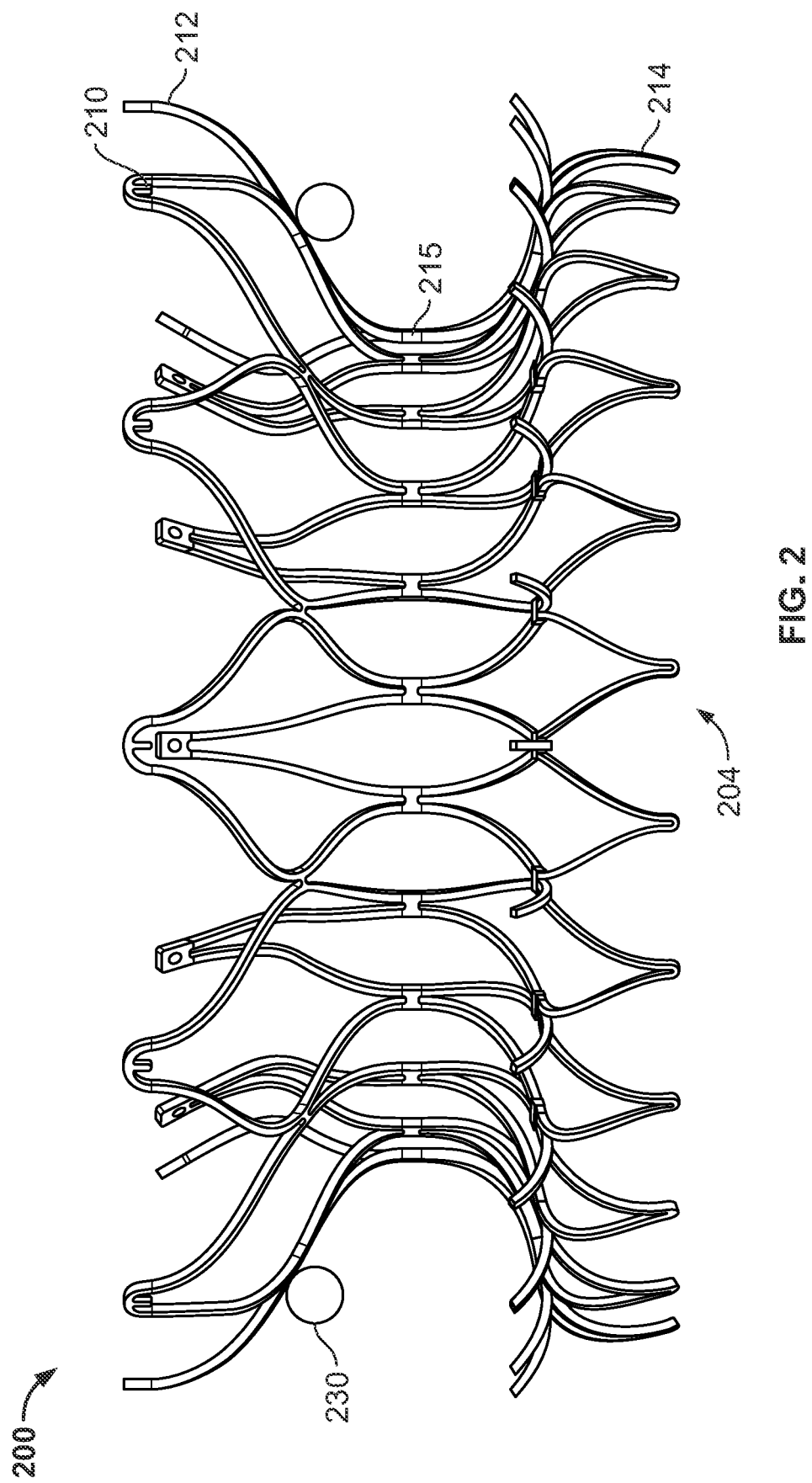
FIG. 2 is a front view of an anchor assembly of a prosthetic mitral valve according to another embodiment of the disclosure showing a cross-sectional view of an attached gasket.

FIG. 2 illustrates the anchor assembly 210 of a prosthetic mitral valve 200 according to another embodiment of the disclosure. Unless otherwise stated, like reference numerals refer to like elements of above-described prosthetic mitral valve 100, but within the 200 series of numbers. Although the exact structure of anchor assembly 210 is different than that of anchor assembly 110, it should be understood that many of the main aspects of the two anchor assemblies, such as a narrow central waist portion 215 flanked by a flared atrial anchor 212 and a flared ventricular anchor 214 near outflow end 204, are similar or identical. Further, it should be understood that the inner strut frame is omitted from the view of FIG. 2, and in practice the prosthetic heart valve 200 may include any suitable inner strut frame, including any of those described herein. The anchor assembly 210 of FIG. 2 further includes a sealing member or gasket 230 coupled thereto. Although not shown in FIG. 2 for ease of illustration, the gasket 230 extends circumferentially around the anchor assembly 210. That is, FIG. 2 illustrates only the cross-section of the gasket 230 according to a front view of the valve 200, but the gasket 230 is configured to extend 360 degrees around the anchor assembly 210 to form a ring shape surrounding the anchor assembly 210. The gasket 230 is illustrated as having a circular cross section and is disposed between the central waist portion 215 and the atrial anchors 212 and may be coupled to the anchor assembly 210 by sewing, suturing, or any other suitable modality. It should be noted that the cross-sectional shape of the gasket 230 may be any shape, such as ovular, elliptical, diamond, stadium-shaped, etc. It is contemplated that the gasket 230 may be disposed at any axial location along the valve, although it may be preferable to position the gasket 230 at a location near or adjacent the narrowed central waist portion 215 in order to minimize the collapsed profile of the prosthetic valve 200 and position the gasket 230 against that native valve annulus when implanted. In other words, although the gasket 230 may be placed anywhere along the axial length of the anchor assembly 210, it may be preferable to position the gasket 230 somewhere along the general "C"-shape of the narrowed central waist portion 215 (or at a location where the narrowed central waist portion 215 transitions to either the atrial anchor 212 or ventricular anchor 214) such that the gasket 230 does extend radially outward of the outer surface of the atrial or ventricular anchor 212, 214 when the valve 200 is in a collapsed condition. Thus, when the prosthetic heart valve 200 is expanded and implanted, some portions of the anchor assembly 210 may extend radially beyond the gasket 230, but the gasket 230 will still be configured to seal against tissue of the native valve annulus.

The gasket 230 may be a collapsible tube capable of transitioning from a collapsed stated to an expanded state, although in other embodiments the gasket 230 may have little or no collapsibility. For example, the material forming the tube may have one or more of a variety of structures, such as individual strands braided into a generally tubular mesh structure (e.g., in a helical formation), or an individual strand formed into a coil. Coils (or coil supports) that may be suitable for use within gasket 230 are described in greater detail in U.S. Pat. No. 9,668,858, the disclosure of which is hereby incorporated by reference herein. When in a collapsed state, the gasket 230 may lay flat or substantially flush to the anchor assembly 210 to reduce the packing profile of the valve for loading into a catheter or a delivery device. Upon delivery of the valve, the gasket 230 may be deployed simultaneous to or after the deployment of the prosthetic valve 200 in the native valve annulus. The gasket 230 may be configured to expand to reach a deployed state such that the increase in diameter of the gasket 230 may fill any space between the prosthetic heart valve 200 and the native valve annulus to create or enhance the seal between the prosthetic heart valve and the native valve annulus and prevent PVL. The gasket 230 may contact the native valve annulus around the entire perimeter of the gasket 230, compensating for any portion of the prosthetic heart valve 200 that does not abut the native annulus due to under sizing or any irregularities in the shape of the native valve annulus. The gasket 230 may apply varying levels of pressure to the native valve annulus due to the irregular shape of the annulus. It should be understood that, along with prosthetic heart valve 100, prosthetic heart valve 200 may include fabric and/or tissue skirts on the luminal and/or abluminal surfaces of the anchor assembly 210 or the inner strut frame, which may also help with providing a seal between the prosthetic heart valve 200 and the native valve annulus. However, the gasket 230 is intended to help further mitigate or eliminate any PVL.

It is contemplated that the gasket 230 may have any diameter suitable for fitting within the native valve annulus and filling an appropriate amount of space to close any gaps and prevent PVL. It is further contemplated that the gasket 230 may have any cross-sectional shape for optimizing the seal between the prosthetic heart valve and the native valve annulus, such as triangular, trapezoidal, ovular, or the like. For example, by providing the gasket 230 as a sealing tube with a triangular cross-section, the distance that the gasket 230 extends radially from the prosthetic heart valve 200 may be increased (compared to a circular cross-section) while minimizing the amount of material used (compared to a circular cross-section). The gasket 230 may include vertical slits on the outer surface (i.e. the surface that will confront the native valve annulus) of the gasket 230 to accommodate for the larger outer diameter of the gasket 230 when bent into a ring shape to surround the anchor assembly 210. The gasket 230 may be composed of any suitable material, including those that are biocompatible, such as polyethylene terephthalate ("PET"), ultra-high-molecular-weight polyethylene ("UHMWPE") or the like, or any combination of those materials. In some examples, the gasket 230 may be reinforced with a spiral nitinol wire disposed inside the tube to ensure the shape of the gasket 230 rebounds after transitioning from a collapsed state to an expanded state.

When the prosthetic heart valve 200 is transitioned to a collapsed delivery condition, the anchor assembly 210 may take a mostly cylindrical shape. However, some minimal amount of flared contouring may still remain between the central waist portion 215 and the atrial anchors 212 and ventricular anchors 214 when the prosthetic heart valve 200 is collapsed. With this configuration, if the gasket 230 is positioned near or adjacent the central waist portion 215, even if the gasket 230 is not collapsible (or is only minimally collapsible), the gasket 230 may not add significant bulk to the collapsed prosthetic heart valve 200 due to the remaining contouring of the anchor assembly 210 when collapsed. In other words, even in the collapsed delivery condition, the outer surface of the anchor assembly 210 may have portions that are concave. The gasket 230 may be disposed in a concave portion of the anchor assembly 210 so that the gasket 230 only increases the radial profile of the collapsed prosthetic heart valve 200 minimally, if at all.

FIG. 3 illustrates a prosthetic mitral valve 300 according to another embodiment of the disclosure. Unless otherwise stated, like reference numerals refer to like elements of above-described prosthetic mitral valves 100 and 200, but within the 300 series of numbers. The valve 300 includes an outer skirt 340 circumferentially surrounding the anchor assembly (not shown). In the expanded condition, the outer skirt 340 has a generally hourglass shape with a rounded protrusion 332 that may be axially aligned with the central waist portion 315 of the outer anchor assembly. That is, whereas the anchor assembly (as illustrated by anchor assemblies 110 and 210 in FIGS. 1 and 2, respectively) has a generally hourglass shape with a concave central waist portion, the outer skirt 340 has a convex rounded protrusion 332 that extends radially outward from the central waist portion of the anchor assembly. Although only a front view of the valve 300 is illustrated in FIG. 3, the rounded protrusion 332 may extend radially outward around 360 degrees of the outer skirt 340 of the valve 300. The outer skirt 340 may be shape-set to the illustrated shape when deployed, such that the rounded protrusion 332 protrudes radially outward to perform substantially the same function as the gasket 230 described with reference to the valve 200 above without the additional material of the gasket. In other words, when the prosthetic heart valve 300 is deployed into the native valve annulus, the rounded protrusion 332 of skirt 340, which may be positioned adjacent the central waist portion 315 of the anchor assembly, may tend to push against the valve annulus to fill any potential gap spaces that would otherwise exist between the prosthetic heart valve 300 and the native valve annulus. In some examples, prior to its attachment to the anchor assembly, the outer skirt 340 may have a heat set profile so that the outer skirt 340 is longer relative to the anchor assembly to which it will be attached. The outer skirt may then be "scrunched" (or axially shortened) when it is attached to the anchor assembly, thus forming (or increasing the prominence of) the rounded protrusion. Such a configuration may assist with the rounded protrusion conforming to the native valve annulus, allowing the outer skirt to expand where the anchor assembly is undersized and does not otherwise contact the native valve annulus, while simultaneously compressing to the anchor assembly where the anchor assembly does contact the native valve annulus. As described above in reference to the gasket, it is contemplated that the rounded protrusion of the outer skirt may form any cross-sectional shape when the skirt is scrunched, such as a circle, oval, triangle, trapezoid, etc.

Figure 3A:
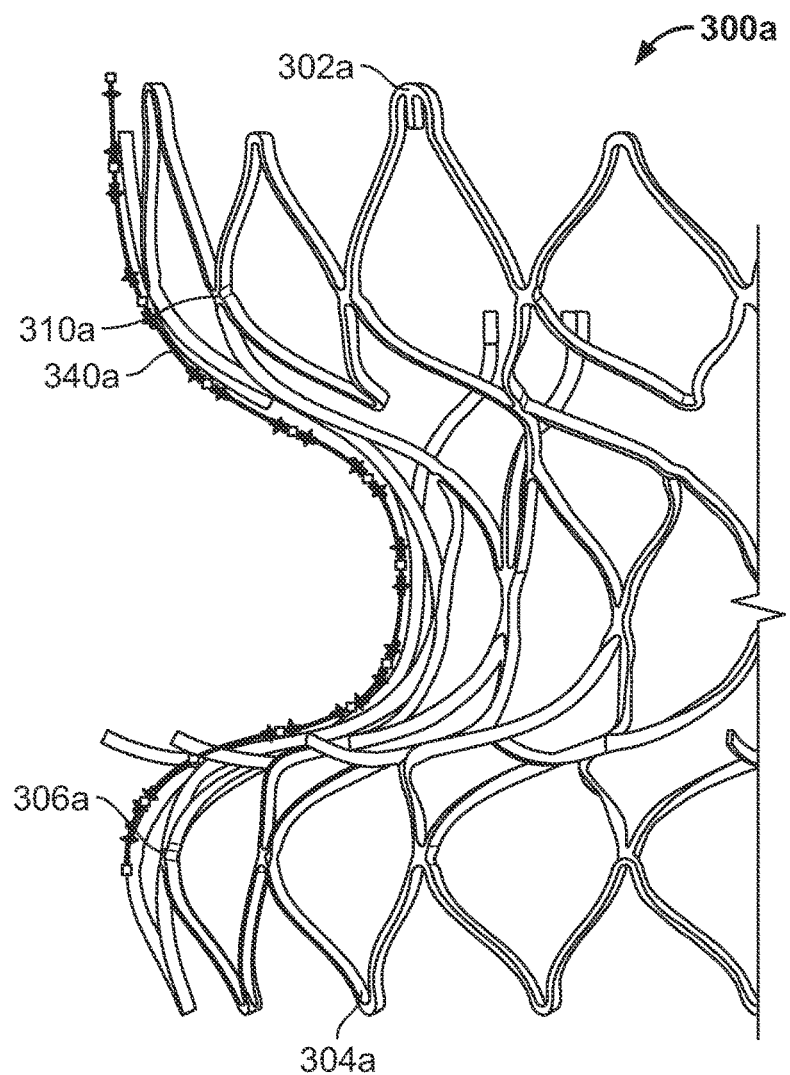
FIG. 3AA is a front view of a portion of a prosthetic mitral valve with an outer skirt according to an embodiment of the disclosure.
Figure 3A:
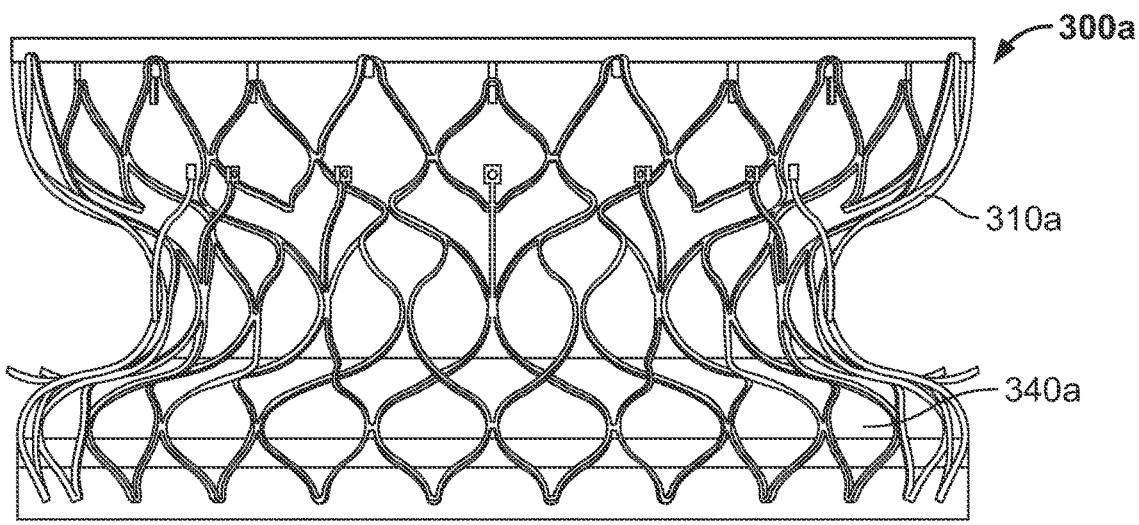
Figure 3A:
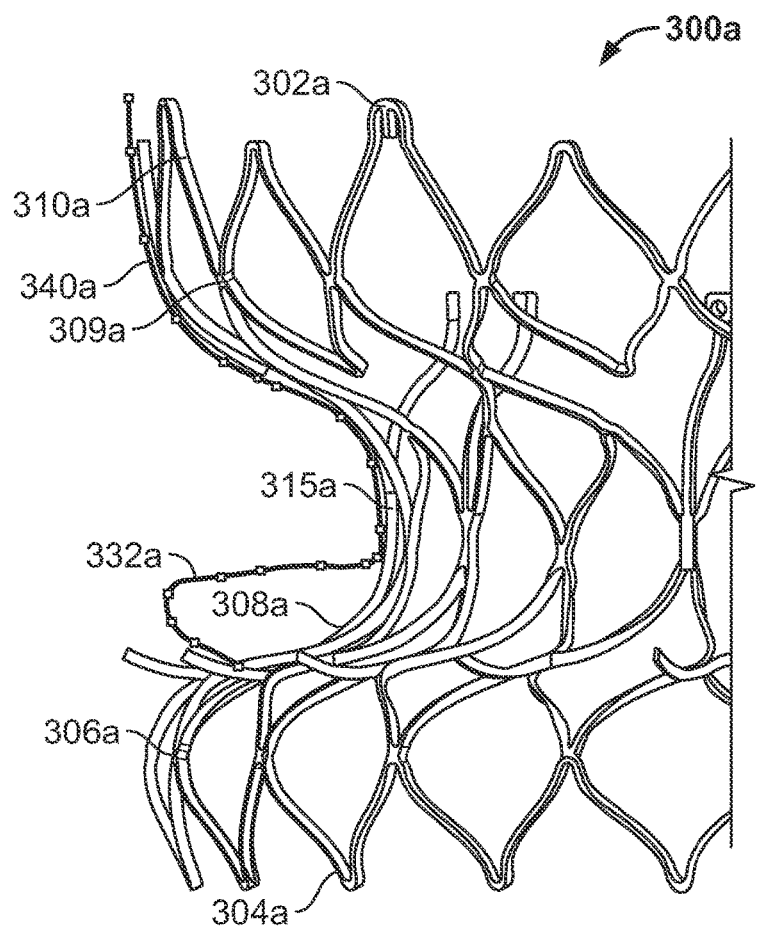
Figure 3A:
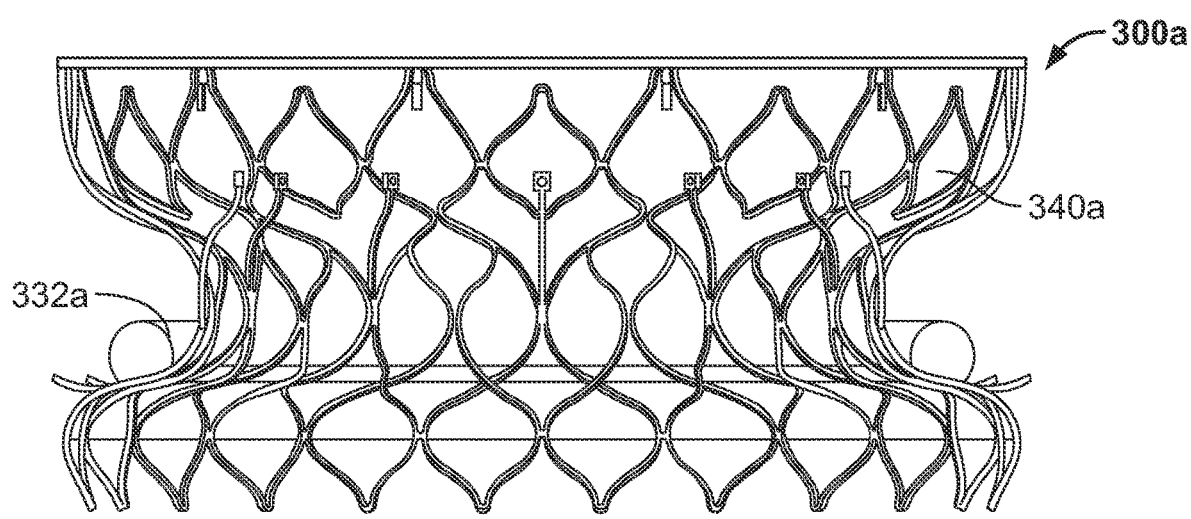
Figure 3A:
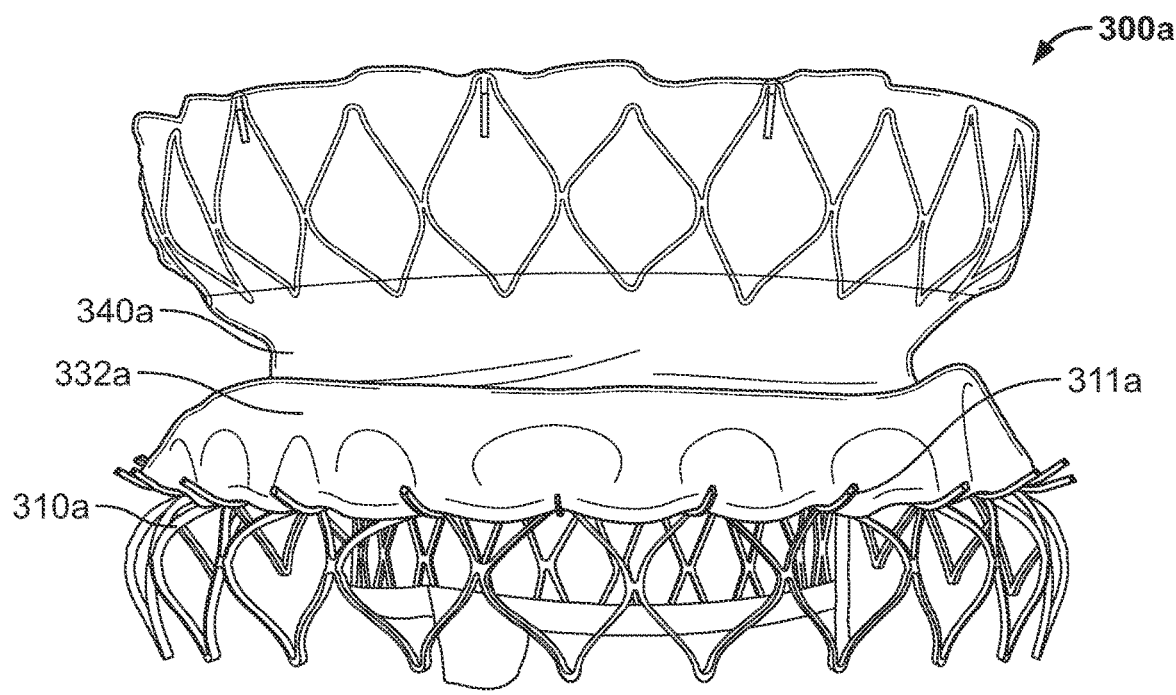
Figure 3A:
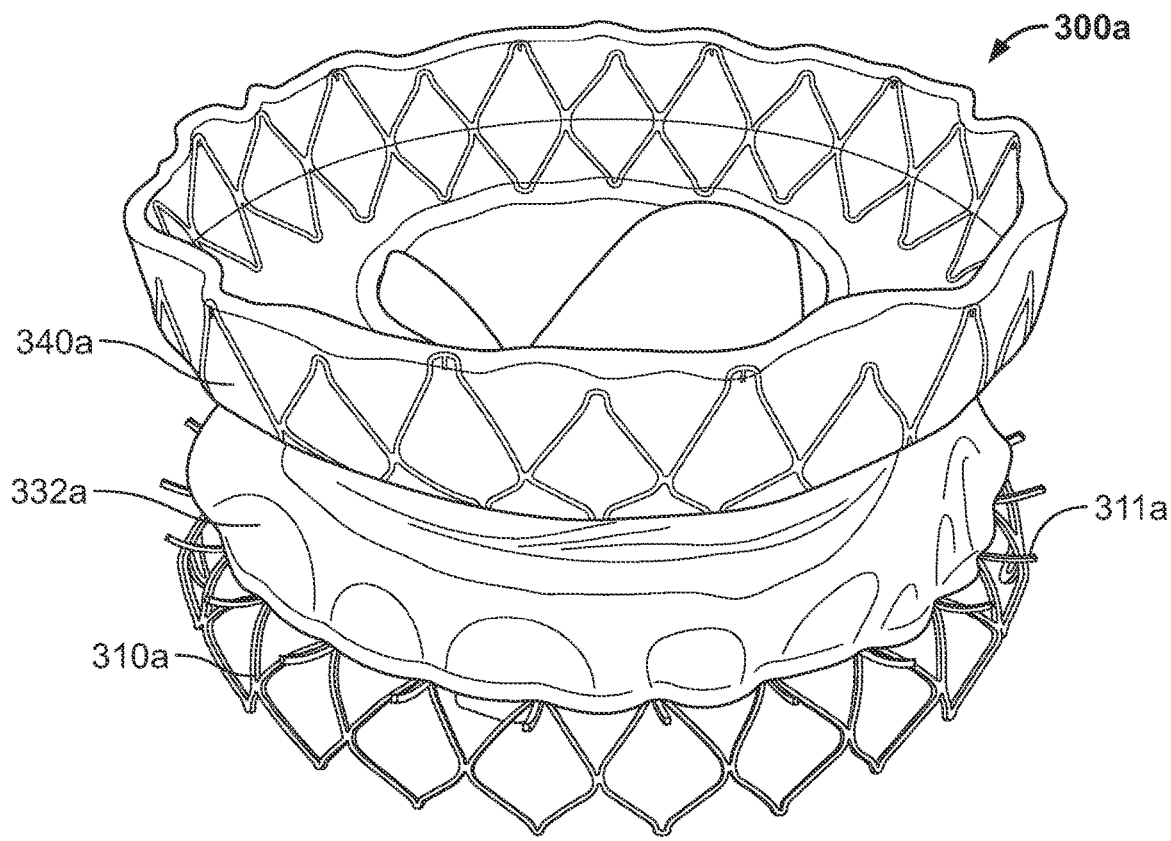
Figure 3A:
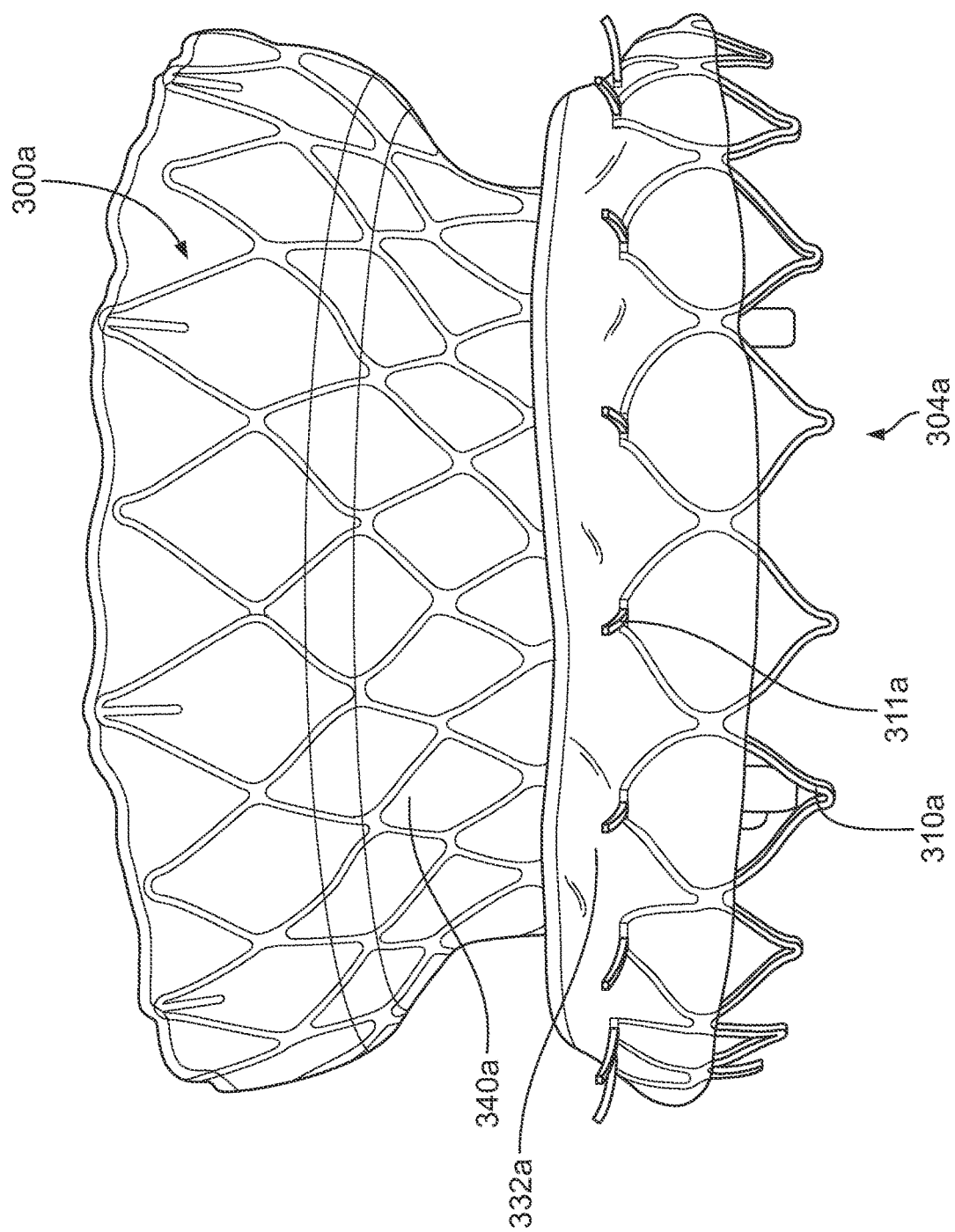

Similar to the gasket 230, it is contemplated that the rounded protrusion 332 may be formed or positioned at any axial location along the outer skirt 340 such that, in some examples, the rounded protrusion may be disposed closer to or biased toward one of the inflow or outflow ends 302, 304 of the prosthetic heart valve 300. Additional examples are illustrated in FIGS. 3AA-3BB. FIGS. 3AA and 3AA' show a portion of a prosthetic mitral valve 300a with an outer skirt 340a having a resting state (i.e., undeformed) in which the skirt has been woven to be shaped to contour the surface of the anchor assembly 310a. In some examples, the outer skirt 340a may be manufactured in the undeformed state as shown in FIGS. 3AA and 3AA', and may be sewn to anchor assembly 310a thereafter. In other words, the shape of outer skirt 340a shown in FIGS. 3AA and 3AA' may demonstrate the shape of the skirt before the skirt is positioned on the anchor assembly, and also may demonstrate the shape of the skirt after the skirt is positioned on the anchor assembly (such that the skirt surrounds the anchor assembly) but before the skirt is deformed (e.g., by sewing the skirt to the anchor assembly in a shape other than the skirt's resting state, as described with respect to FIGS. 3AB and 3AB'). It should be understood that other components of prosthetic mitral valve 300a, such as an inner stent carrying prosthetic valve leaflets, is omitted from FIGS. 3AA-3AB' for purposes of clarity of illustration. It should be further understood that FIGS. 3AA-3AB' illustrate only a representative profile of the outer skirt 340a, but the outer skirt 340a extends circumferentially around the outer surface of the anchor assembly 310a. In certain preferred embodiments, outer skirt 340a may extend approximately from the inflow end 302a to a location on the valve 300a near the outflow end 304a, such as ventricular portion 306a, and have a contour length (similar to contour length 105, i.e., the distance the outer skirt 340a extends along the outer surface profile of the anchor assembly 310a between the inflow and outflow ends) between about 29 mm and about 31 mm.

Outer skirt 340a is shown in FIGS. 3AA and 3AA' extending continuously along the outer surface of anchor assembly 310a, but outer skirt 340a may be reconfigured or rearranged such that an end or a portion of the skirt at or nearest the ventricular portion 306a of the valve 300a may be scrunched or folded up and coupled to the anchor assembly 310a at a location farther from the outflow end 304a compared to the location shown in FIGS. 3AA and 3AA'. It should be noted that the scrunching or folding of the outer skirt 340a may be achieved before or after the outer skirt 340a is coupled (e.g., sewn) to the anchor assembly 310a. That is, the outer skirt may be positioned over and around the anchor assembly, and the scrunching of the skirt may be performed with the skirt in any orientation or positioning while it surrounds the anchor assembly. Central waist portion 315a includes a transition portion 308a (labeled in FIG. 3AB) where the anchor assembly contours radially outward from central waist portion 315a to transition to ventricular portion 306a. The scrunching and coupling of outer skirt 340a may form rounded protrusion 332a, or a bump-out portion of the outer skirt 340a, that may extend in a direction generally radially outward from transition portion 308a, as shown in FIGS. 3AB and 3AB'. In such an orientation, rounded protrusion 332a is disposed axially proximate to, but slightly offset from central waist portion 315a such that the rounded protrusion is closer to the ventricular portion 306a of the valve 300a than the atrial portion 309a or inflow end. FIG. 3AB illustrates a profile view of rounded protrusion 332a, however, a rounded protrusion may be formed up to 360 degrees around the outer circumference of prosthetic mitral valve 300a as shown in FIGS. 3AB', 3AC and 3AD. The outer skirt 340a may be shape-set to the illustrated shape when deployed and rounded protrusion 332a may perform substantially the same function as the gasket 230 and the rounded protrusion 332 described above. In other words, when the prosthetic heart valve 300a is deployed into the native valve annulus, the rounded protrusion 332a may tend to push against the valve annulus to fill any potential gap spaces that would otherwise exist between the prosthetic heart valve 300a and the native valve annulus. It should further be understood that, with the configuration of outer skirt 340a illustrated and described in connection with FIGS. 3AA-3AE, the outflow end of the anchor assembly 310a, for example the terminal outflow row of diamond-shaped cells, may remain uncovered by outer skirt 340a. In the embodiment illustrated in FIGS. 3AC-3AD, both the terminal outflow row of cells, as well as about half of the next adjacent row of cells (e.g. near ventricular anchoring tines 311a of the anchor assembly 310a), may remain uncovered by the outer skirt 340a. The cells that remain uncovered by the outer skirt 340a allow for blood to flow through those cells, which may help reduce possible obstruction of the left ventricular outflow tract ("LVOT") when the prosthetic mitral valve is implanted. If the prosthetic valve is being used to replace the tricuspid valve, this feature may instead reduce possible obstruction of the right ventricular outflow tract ("RVOT").

Another example of outer skirt 340a covering anchor assembly 310a is shown in FIG. 3AE, in which rounded protrusion 332a is formed in a manner similar to that described above with reference to FIGS. 3AC and 3AD. However, relative to the examples of FIGS. 3AC and 3AD, the outer skirt 340a extends further toward the outflow end 304a of the anchor assembly 310a. As shown in FIG. 3AE, approximately half of the diamond-shaped cells of the terminal outflow row of the anchor assembly 310a are covered by the outer skirt 340a, and the outer skirt 340a extends toward the outflow end 304a beyond the ventricular anchoring tines 311a, such that the tines 311a extend through the outer skirt 340a, which may anchor and maintain the shape of the outer skirt 340a with respect to the anchor assembly 310a.

Figure 3B:
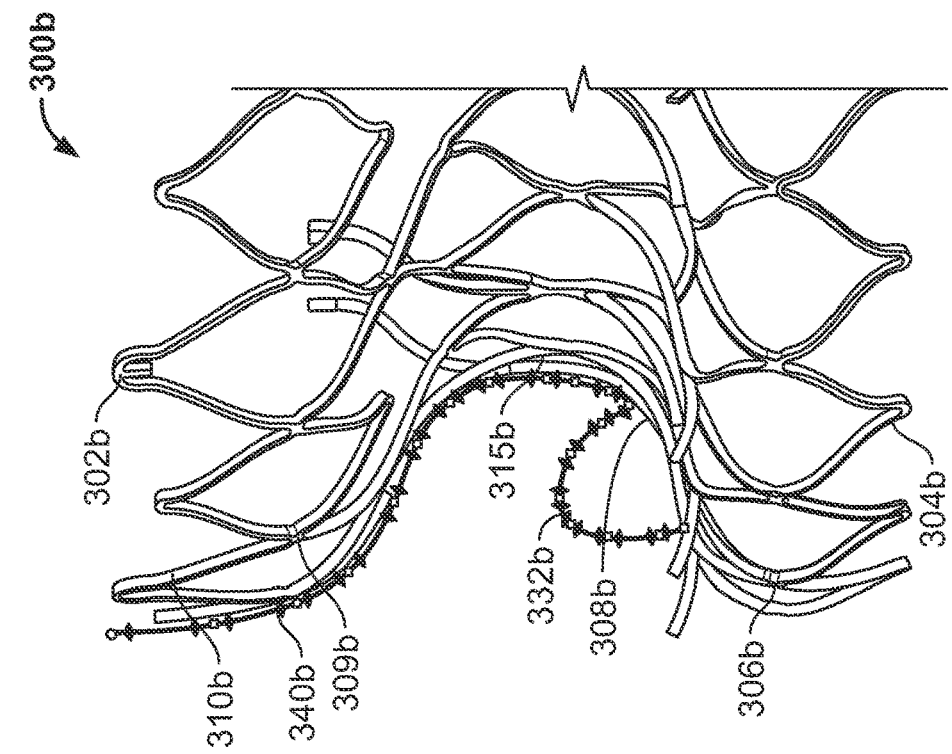
FIG. 3BA is a front view of a portion of a prosthetic mitral valve with an outer skirt according to another embodiment of the disclosure.
Figure 3B:
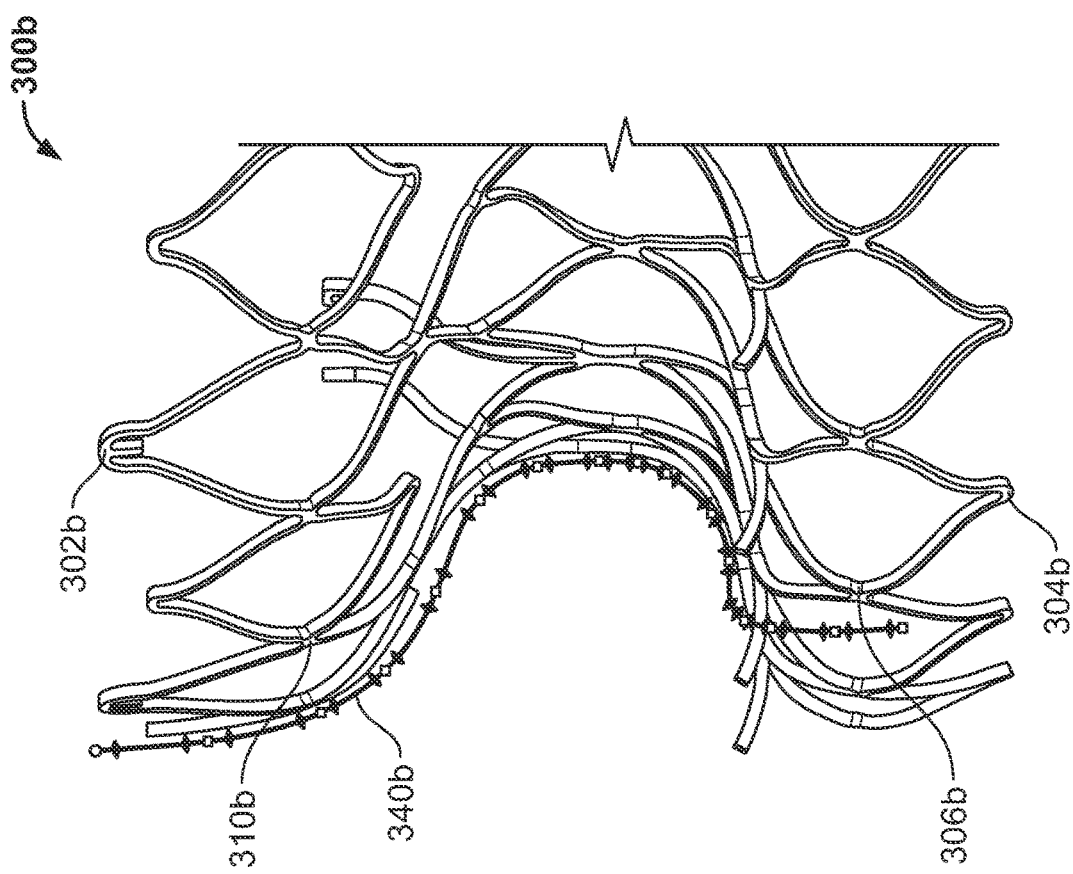

In another example, prosthetic mitral valve 300b illustrated in FIGS. 3BA-3BB includes an outer skirt 340b. Similar to outer skirt 340a, outer skirt 340b may have a resting state (i.e., undeformed) in which the outer skirt has been woven to be shaped to contour the surface of the anchor assembly 310b. In some examples, the outer skirt 340b may be manufactured in the undeformed state, and may be sewn to anchor assembly 310a thereafter, as shown in FIG. 3BA. In other words, the shape of outer skirt 340b shown in FIG. 3BA may demonstrate the shape of the skirt before the skirt is positioned on the anchor assembly, and also may demonstrate the shape of the skirt after the skirt is positioned on the anchor assembly (such that the skirt surrounds the anchor assembly) but before the skirt is deformed (e.g., by sewing the skirt to the anchor assembly in a shape other than the skirt's resting state, as described with respect to FIG. 3BB). It should be understood that other components of prosthetic mitral valve 300b, such as an inner stent carrying prosthetic valve leaflets, is omitted from FIGS. 3BA-3BB for purposes of clarity of illustration. It should be further understood that FIGS. 3BA-3BB illustrate only a representative profile of the outer skirt 340a, but the outer skirt 340a extends circumferentially around the outer surface of the anchor assembly 310a. In certain preferred embodiments, outer skirt 340b may extend approximately from the inflow end 302b to a location on the valve 300b near the outflow end 304b, such as ventricular portion 306b, and have a contour length (similar to contour length 305, i.e., the distance the outer skirt 340b extends along the surface of the anchor assembly 310b between the inflow and outflow ends) between about 29 mm and about 31 mm.

Outer skirt 340b is shown in FIG. 3BA extending continuously along the outer surface of anchor assembly 310b, but outer skirt 340b may be reconfigured such that an end or a portion of the skirt at or nearest the ventricular portion 306b of the valve 300b may be scrunched or folded up and coupled to the anchor assembly 310b at a location farther from the outflow end 304b compared to the location shown in FIG. 3BA. Central waist portion 315b includes a transition portion 308b (labeled in FIG. 3BB) where the anchor assembly contours radially outward from central waist portion 315b to transition to ventricular portion 306b. The scrunching and coupling of outer skirt 340b may form rounded protrusion 332b, or a bump-out portion of the outer skirt 340b, that may extend in a direction generally axially toward inflow end 302b from transition portion 308b, and may also extend slightly radially outward from transition portion 308b, as shown in FIG. 3BB. In such an orientation, rounded protrusion 332b is disposed axially proximate to, but slightly offset from central waist portion 315b such that the rounded protrusion is closer to the ventricular portion 306b of the valve 300b than the atrial portion 309b. Rounded protrusion 332b may differ from rounded protrusion 332a in size, shape and/or orientation due to the manner and placement in which the end of the outer skirt 340b nearest the outflow end 304b is coupled to the anchor assembly 310b, FIG. 3BB illustrates a profile view of rounded protrusion 332b, however, a rounded protrusion may be formed up to 360 degrees around the outer circumference of prosthetic mitral valve 300b. The outer skirt 340b may be shape-set to the illustrated shape when deployed and rounded protrusion 332b may perform substantially the same function as rounded protrusion 332a, i.e., to push against the valve annulus to fill any potential gap spaces that would otherwise exist between the prosthetic heart valve 300b and the native valve annulus. It is contemplated that one example (e.g., valve 300a or valve 300b) may be preferable over another in certain situations or for certain patients having uniquely shaped native valve annuluses to ensure optimal coverage of the annulus and prevent or reduce risk of PVL. It should be noted that, as described above, at least the terminal outflow row of diamond-shape cells may remain uncovered by the outer skirt 340b, and therefore the same principles as described above with respect to valve 300a may apply to valve 300b.

Referring now back to the example shown in FIG. 3, the outer skirt 340 defines a contour length 305. As described above, the contour length is defined as the length extending from the inflow end 302 to the outflow end 304 of the anchor assembly 310 following the outer surface profile of the anchor assembly 310. The outer skirt contour length 305 may be greater than that of the anchor assembly 310 disposed beneath the outer skirt (e.g., the contour length 105 shown in FIG. 1) when using a skirt composed of an inelastic material. Alternatively, the outer skirt contour length 305 may be approximately the same as that of the anchor assembly disposed beneath the outer skirt (e.g., the contour length 105 shown in FIG. 1) when using a skirt composed of an elastic material. Thus, when the valve 300 (including the outer skirt 340) is in the collapsed state, the outer skirt 340 may be equal in axial length to the anchor assembly. In the collapsed state, the outer skirt 340 and the anchor assembly may both have a generally cylindrical configuration with a similar or identical axial length. As a result, when in the collapsed condition, the outer skirt 340 will tend to very closely follow the contours of the collapsed anchor assembly with little or no slack, bunching, or otherwise loose material in the outer skirt 340. This minimization or elimination of slack or bunching in the outer skirt 340 may help allow the collapsed prosthetic heart valve 300 to readily fit within the delivery device or catheter while minimizing packing volume or bulk of the prosthetic heart valve 300, while maintaining the benefit of the outer skirt 340 acting as a gasket when deployed to minimize or eliminate PVL. In other words, there may be little or no excess material increasing the profile of the prosthetic heart valve 300 when the valve is collapsed because the outer skirt may press flat against the anchor assembly due to their equivalent lengths.

While the outer skirt 340 (and particularly the rounded protrusion 332 thereof) may help prevent or eliminate PVL by virtue of its shape and structure alone, the effect may be further enhanced via billowing outwardly from retrograde flow into the outer skirt 340. In other words, once the valve 300 is implanted, significant pressure will be applied to the prosthetic heart valve 300 when the ventricle contracts and the prosthetic leaflets within the prosthetic heart valve 300 are closed. When the ventricle contracts, the increase in pressure will tend to force blood from the ventricle into the outflow end 304 and push against the interior of the outer skirt 340, which may assist the outer skirt 340 to take its set shape and to further billow the outer skirt 340 into any gaps between the prosthetic heart valve 300 and the native valve annulus. Thus, to the extent that any gaps still remain, back pressure from the ventricle may help ensure a complete seal between the prosthetic heart valve 300 and the native valve annulus. It is contemplated that the outer skirt 340 may be composed of any suitable material, such as PET, UHMWPE or the like, or any combination of those materials. Shape setting of the outer skirt 340 may be performed by any suitable method, for example including positioning the outer skirt 340 over a mandrel having the desired shape and heating the outer skirt 340 while the mandrel forces the outer skirt 340 to have the desired shape. Alternatively or additionally, various weaving processes may be employed to achieve a particular desired shape for the outer skirt 340.

In some embodiments, the outer skirt 340 may be designed so that it does not significantly constrain (or whatsoever constrain) the anchor assembly 110 or frame (which may be formed of nitinol) to which it is attached during loading (e.g. collapsing) the prosthetic heart valve into a delivery device. For example, when the prosthetic heart valve is loaded into a delivery device in the collapsed condition, the axial length of the anchor assembly 110 (such as an outer frame thereof) between the tip of the atrial anchor 112 and the tip of the ventricular anchor 114 may be substantially equal or identical to the length of the outer skirt 340 between those same reference points. Because these "straight" lengths are about equal or identical when the prosthetic heart valve is in the collapsed loaded conditions, the outer skirt 340 will not tend to pull or otherwise constrain the anchor assembly 110, but the outer skirt 340 will still be capable of protruding outwardly when the prosthetic heart valve is implanted in the expanded condition to help mitigate PVL.

FIG. 4 illustrates a prosthetic mitral valve 400 according to another embodiment of the disclosure. Unless otherwise stated, like reference numerals refer to like elements of above-described prosthetic mitral valves 100, 200 and 300, but within the 400 series of numbers. The prosthetic heart valve 400 is substantially similar to the prosthetic heart valve 300 described above having an outer skirt 440 circumferentially surrounding the anchor assembly with a generally hourglass shape and a rounded radial protrusion 432 at the central waist portion 415 of the anchor assembly. The valve 400 further includes a gasket 430 disposed between the outer skirt 440 and the anchor assembly (not shown), between the rounder radial protrusion 432 and the central waist portion 415 of the anchor assembly. Although only the cross-section of the gasket 430 according to a front view of the valve 400 is shown in FIG. 4 for ease of illustration, the gasket 430 extends 360 degrees around the prosthetic heart valve 400 contouring the inner circumference of the radial protrusion 432 of the outer skirt 440 and the outer circumference of the anchor assembly at the central waist portion 415 of the anchor assembly of the prosthetic heart valve 400. The gasket 430 may act as additional support to help the outer skirt 440 resume its expanded shape upon deployment of the prosthetic heart valve 400, particularly at the location of the radial protrusion 432. Thus, the combined effect of the radial protrusion 432 of the outer skirt 440 and the gasket 430 pushing against the native valve annulus may further reduce the likelihood of PVL. Further, insertion of the gasket 430 between the interior surface of the outer skirt 440 and the exterior surface of the anchor assembly may help the prosthetic heart valve 400 to maintain a smooth outer surface on the skirt 440 during loading into a delivery device. For example, one way in which the prosthetic heart valve 400 may be collapsed for loading into a delivery device is by pulling or pushing the prosthetic heart valve 400 through a funnel member to force the prosthetic heart valve to collapse. During this process, the inclusion of the gasket 430 between the radial protrusion 432 and the central waist portion 415 of the anchor assembly may help promote smooth collapsing of the prosthetic heart valve 400 as it passes through the loading funnel and the catheter, for example by avoiding any catches or steps created by material of the skirt 440 bunching, particularly near the location of the radial protrusion 432. By avoiding any bunching of material while transitioning the prosthetic heart valve 400 to the collapsed condition, increased forces during loading (and also deployment) may be avoided. The gasket 430 may be composed of any shape memory material, such as nitinol or the like, or may be formed having similar shapes and/or structures as those described above for gasket 230.

FIG. 5 illustrates a prosthetic mitral valve 500 according to yet another embodiment of the disclosure. Unless otherwise stated, like reference numerals refer to like elements of the above described prosthetic mitral valves 100, 200, 300 and 400, but within the 500 series of numbers. The prosthetic mitral valve 500 includes a strut frame 520 and an anchor assembly 510 coupled to and surrounding the strut frame 520. The anchor assembly 510 has a generally hourglass shape, similar to that of the valve 100 as described above, wherein the atrial anchors 512 and ventricular anchors 514 generally flare radially outward with a concave central waist portion 515. Anchor assembly 510 may be substantially similar or identical to that shown in FIG. 2, although it should be understood that other configurations of anchor assemblies, including that shown in FIG. 1 and variations thereof, may be suitable for use with prosthetic mitral valve 500. The prosthetic mitral valve 500 further includes an inflatable gasket 530 that is disposed around the central waist portion 515 of the anchor assembly 510 and extends circumferentially around the prosthetic heart valve 500. Although only the cross-section of the gasket 530 according to the front view is shown in FIG. 5, the gasket 530 extends 360 degrees around the valve 500.

Figure 5A:
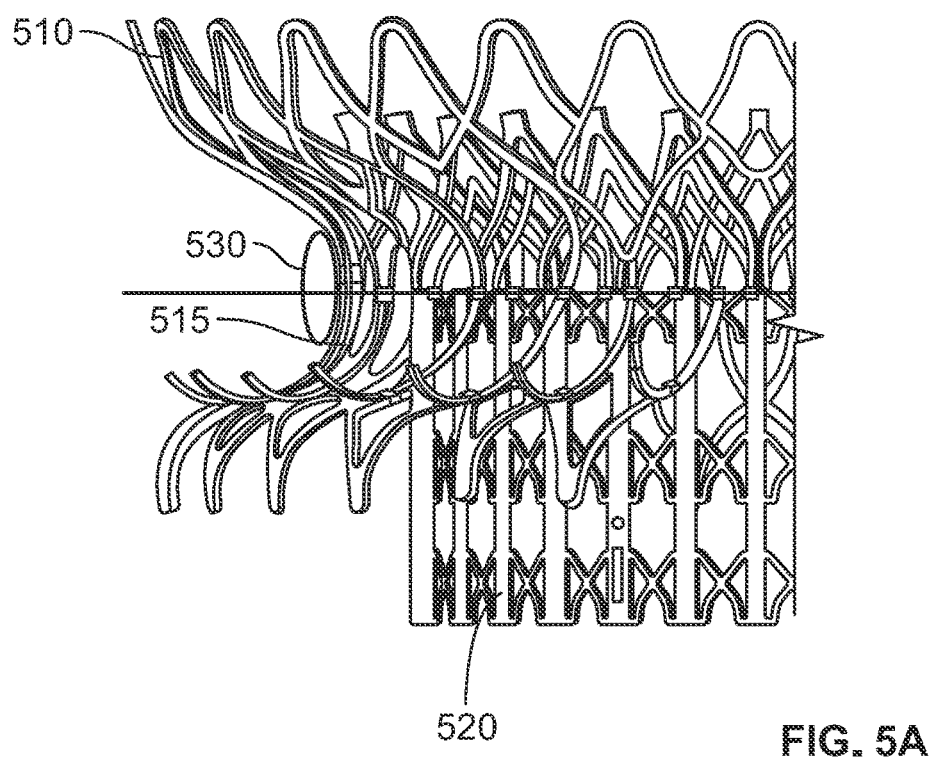
FIGS. 5A-B are close up views of the prosthetic mitral valve of FIG. 5 illustrating the gasket in a deflated state and an inflated state, respectively.
Figure 5B:
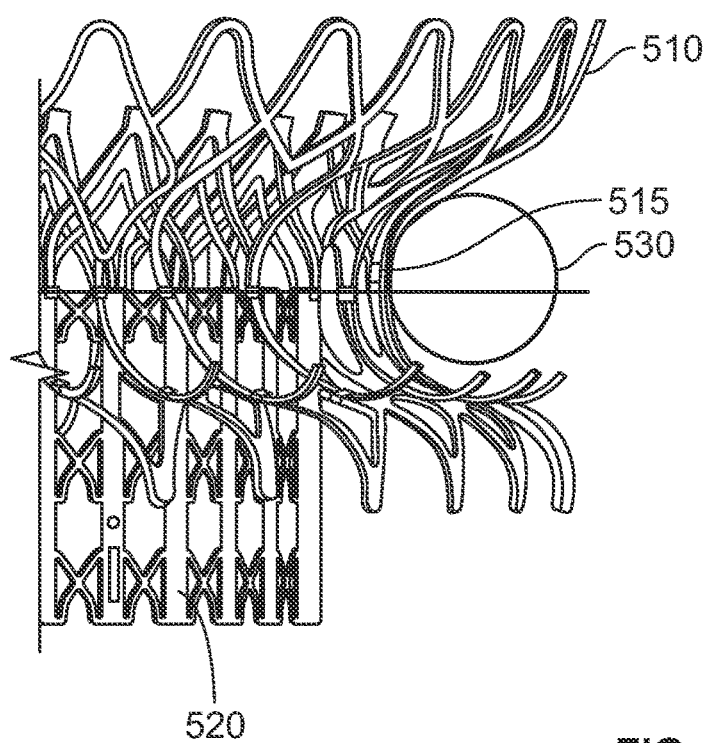
Figure 6:
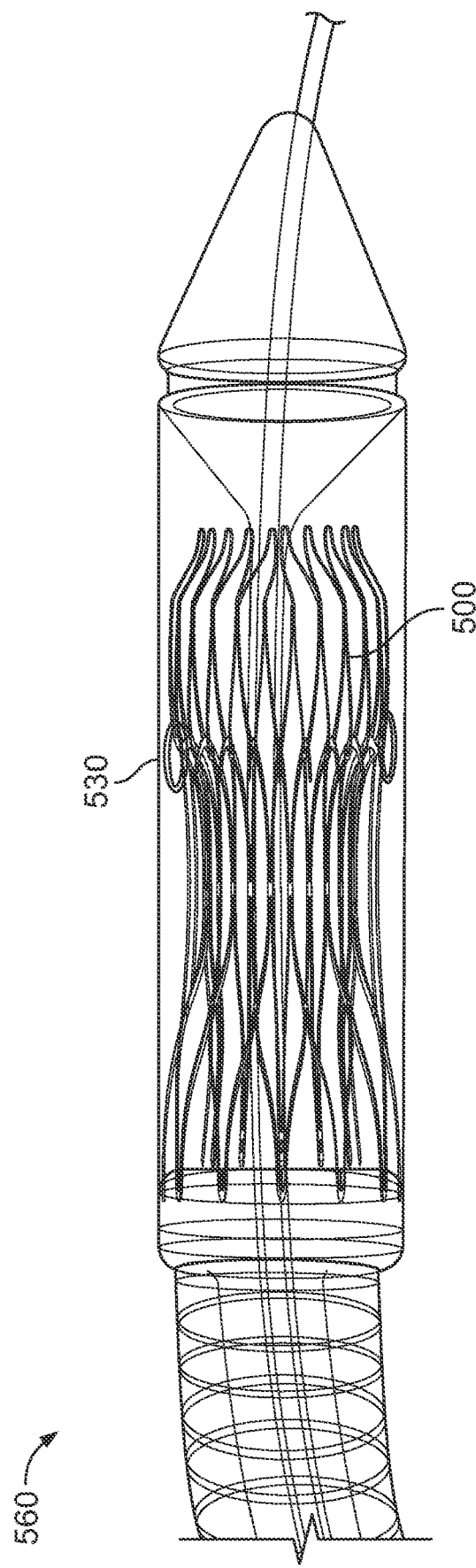
FIG. 6 is a cross-sectional view of a delivery device having the prosthetic mitral valve of FIG. 5 disposed therein.

The left side of the prosthetic heart valve 500 in FIG. 5, illustrated more closely in FIG. 5A, shows the gasket 530 in a deflated state. The right side of the prosthetic heart valve 500 in FIG. 5, illustrated more closely in FIG. 5B, shows the gasket 530 in an inflated state. It should be understood that, although FIG. 5 illustrates a portion of the gasket 530 in an inflated state and another portion of the gasket 530 in a deflated state, this is mainly for illustrating the difference between the two states and, in practice, the entire gasket 530 would typically have a similar level of inflation at any given point in time. The gasket 530 may be in a deflated state when the prosthetic heart valve 500 is collapsed to be loaded into a catheter or delivery device, while the prosthetic heart valve 500 is delivered to the native valve annulus, and immediately following initial deployment of the prosthetic heart valve 500 into the native valve annulus. After the prosthetic heart valve 500 is deployed from the delivery device and implanted into the native valve annulus, the gasket 530 may then be inflated via injection of an inflation medium through an injection tube (not shown) disposed within the delivery device and connected to the gasket 530. The gasket 530 may be inflated with any suitable substance, such as a gas (e.g., carbon dioxide), a saline solution, a gel, a liquid polymer or a liquid polymer configured to be hardened after implantation. After injection of the substance is complete and the gasket 530 is inflated, the injection tube may be disconnected from the gasket 530 and the delivery device may be retracted from the deployment position. The injection tube may have a first end coupled to the gasket 530 and a second opposite end positioned outside the patient, with the first and second ends fluidly coupled by an intermediate portion extending through the delivery device. In one example, the first end of the injection tube may have threads that are threadedly received in a corresponding port of the gasket 530, with the injection tube being unscrewed from the port of the gasket 530 after inflation of the gasket 530 is complete. However, any other structure and methods for connection (and disconnection) between the inflation tube and the gasket 530 may be suitable. The gasket 530 may include a valve to ensure that the inflation medium remains inside the gasket 530 after injection. It is also contemplated that a means for sealing the gasket 530 may be used to maintain the substance inside the gasket 530, such as a plug, a knot, a staple, a sling or the like. It should be understood that the inflatable gasket 530 as described herein is not limited to use with only the prosthetic heart valve 500 described, but may be used with any valve having any geometry. The implementation of the gasket 530 with the prosthetic heart valve 500 having such a geometry is advantageous because the gasket 530 will not add, or will at most minimally add, to the profile of the prosthetic heart valve 500 when the prosthetic heart valve 500 is in a collapsed state and disposed within the delivery device 560, as shown in FIG. 6. Thus, the prosthetic heart valve 500 maintains the ability to be inserted into and deployed from the delivery device 560 with ease.

In some examples, the prosthetic heart valve 500 may further include an outer skirt similar to that of outer skirt 340 described above with respect to the valve 300. The inflatable gasket 530 may be disposed around the central waist portion 515 of the anchor assembly but radially inward of the outer skirt. That is, the outer skirt may be the outermost piece of the prosthetic heart valve 500 and the inflatable gasket 530 may be configured to apply pressure to the outer skirt as the gasket 530 inflates or expands, which then applies pressure to the native valve annulus when the prosthetic heart valve 500 is implanted. Alternatively, the inflatable gasket 530 may be disposed radially outward of the outer skirt. That is, the gasket 530 may expand upon inflation and apply direct pressure to the native valve annulus to prevent PVL. However, it should be understood that gasket 530 may similarly be used with a more traditional outer skirt, including one that is not shape-set. And, as with the other embodiments described herein, prosthetic heart valve 500 includes prosthetic leaflets within the inner stent or strut frame to allow for unidirectional flow of blood through the prosthetic heart valve 500. The inflatable gasket 530 may be composed of a soft elastic material, such as thermoplastic polyurethane (TPU), polyether block amide (e.g., PEBAX®) or the like to promote the assumption of any geometry to fill any gaps between the valve 500 and the native annulus upon expansion of the gasket 530.

In some examples, gasket 530 may be filled with a material which swells upon contact with a fluid, such as any spongy material. Any fluid contained by the spongy material may be squeezed from the gasket prior to loading of the valve in the catheter to reduce the gasket to a minimal size for loading. After the valve is deployed from the catheter, the spongy material within the gasket may be injected or otherwise exposed to fluid to cause the spongy material to swell and the gasket to expand. In further examples, gasket 530 may be filled with a non-Newtonian fluid such as a gel-like material. The gel may be injected into the gasket through a thin-walled tubing, in which pressure to the gel may be applied to decrease the viscosity of the gel for injection, and the viscosity of the gel may thereafter increase upon entry into the gasket. In still further examples, the gasket 530 may be formed of an electron spinning material, may have resting state from which the material is highly compressible, and which also may expand from a compressed state to the resting state in the absence of pressure. Such a material may promote the ingrowth of cells which will help anchor the prosthetic valve in the native valve annulus to reduce or eliminate perivalvular leakage. The gasket 530 may alternatively be formed of a biodegradable material which may devolve over time within the native valve annulus such that cells may grow around the gasket and eventually replace the biodegradable material within the annulus. In still further examples, a shape-memory wire, such as nitinol, may be advanced into gasket 530 to form the protrusion abutting the native valve annulus. In such an example, the prosthetic valve may be implanted into the native valve annulus, and the shape-memory wire may be passed into the gasket 530 thereafter to form the protrusion.

According to one aspect of the disclosure, a prosthetic heart valve comprises:
- an inner stent frame configured to expand from a collapsed configuration to an expanded configuration; and
- an outer anchor assembly coupled to and disposed radially outward of the inner stent frame, the outer anchor assembly configured to expand from a collapsed configuration to an expanded configuration, the outer anchor assembly including an atrial anchor at an inflow end of the prosthetic heart valve, a ventricular anchor at an outflow end of the prosthetic heart valve, and a central waist portion disposed between the atrial and ventricular anchors,
- wherein in the expanded configuration of the outer anchor assembly, the central waist portion has a diameter smaller than a diameter of the atrial anchor and a diameter of the ventricular anchor; and
- a gasket surrounding an outer circumference of the central waist portion and configured to seal a space between the prosthetic mitral valve and surrounding tissue of a native valve annulus when the prosthetic heart valve is implanted in the native valve annulus, wherein the gasket does not extend radially beyond an outer surface of the atrial anchor nor an outer surface of the ventricular anchor when the prosthetic heart valve is maintained in a collapsed state within a delivery device; and
- a plurality of prosthetic leaflets coupled to an inner circumference of the inner stent frame, the plurality of prosthetic leaflets adapted to allow unidirectional flow of blood through the prosthetic heart valve; and/or
- the atrial anchor is adapted to be disposed on the atrial side of the native valve annulus and the ventricular anchor is adapted to be disposed on the ventricular side of the native valve annulus, the outer anchor assembly forming a shape configured to sandwich the native valve annulus between the atrial and ventricular anchors; and/or
- the gasket has a circular cross-section; and/or
- the gasket has a triangular cross-section; and/or
- the gasket is a collapsible tube configured to transition from a collapsed stated to an expanded state; and/or
- the gasket has a first shape when the prosthetic heart valve is in an expanded state and a second shape when the prosthetic heart valve is in the collapsed state, and the gasket includes a support wire coupled to the gasket and configured to transition the gasket from the second shape to the first shape upon the prosthetic heart valve transitioning from the collapsed state to the expanded state; and/or
- the gasket includes vertical slits along the radially outer surface of the gasket configured to allow the gasket to bend to surround the central waist portion; and/or
- the gasket is configured to be in a deflated state when the prosthetic heart valve is in the collapsed state, and the gasket is configured to inflate via injection of an inflation medium into the gasket; and/or
- the gasket includes a valve configured to contain the inflation medium within the gasket; and/or
- the gasket includes a sealing member configured to contain the inflation medium within the gasket; and/or
- an outer skirt surrounding an outer surface of the outer anchor assembly and extending from the inflow end to the outflow end along the outer surface of the outer anchor assembly; and/or
- the gasket is disposed radially outward of the outer skirt; and/or
- the gasket is disposed radially inward of the outer skirt; and/or
- the central waist portion is radially concave relative to the atrial and ventricular anchors; and/or
- the gasket is axially aligned with the central waist portion of the anchor assembly; and/or
- the gasket does not extend radially beyond the outer surface of the atrial anchor nor the outer surface of the ventricular anchor when the prosthetic heart valve in an expanded state.

According to another aspect of the disclosure, a prosthetic heart valve comprises:
- an inner stent frame configured to expand from a collapsed configuration to an expanded configuration; and
- an outer anchor assembly coupled to and disposed radially outward of the inner stent frame, the outer anchor assembly configured to expand from a collapsed configuration to an expanded configuration, the outer anchor assembly including an atrial anchor at an inflow end of the prosthetic heart valve, a ventricular anchor at an outflow end of the prosthetic heart valve, and a central waist portion disposed between the atrial and ventricular anchors,
- wherein in the expanded configuration of the outer anchor assembly, the central waist portion is concave along an outer surface of the outer anchor assembly; and
- an outer skirt disposed radially outward of the outer anchor assembly,
- wherein in the expanded configuration of the outer anchor assembly, the outer skirt includes a convex protrusion around an outer surface of the outer skirt, the convex protrusion axially aligned with the concave central waist portion of the outer anchor assembly; and
- a plurality of prosthetic leaflets coupled to an inner circumference of the inner stent frame, the plurality of prosthetic leaflets adapted to allow unidirectional flow of blood through the prosthetic heart valve; and/or
- the atrial anchor is adapted to be disposed on an atrial side of a native valve annulus and the ventricular anchor is adapted to be disposed on a ventricular side of the native valve annulus, the outer anchor assembly forming a shape configured to sandwich the native valve annulus between the atrial and ventricular anchors; and/or
- the outer skirt has a first contour length extending from an inflow edge of the outer skirt to an outflow edge of the outer skirt, and the outer anchor assembly has a second contour length extending from an inflow edge of the outer anchor assembly to an outflow edge of the outer anchor assembly, the first contour length being equal to the second contour length; and/or in the collapsed configuration of the outer anchor assembly, the outer skirt lays flat against the outer anchor assembly; and/or the outer skirt is formed of polyethylene terephthalate (PET) or ultra-high-molecular-weight polyethylene (UHMWPE)

the concave central waist portion includes a transition portion that connects the concave central waist portion to a ventricular portion of the valve, and the convex protrusion of the outer skirt is disposed at the transition portion; and/or the convex protrusion protrudes radially outwardly from the transition portion; and/or the convex protrusion protrudes axially toward the inflow end and radially outwardly from the transition portion.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A prosthetic heart valve comprising:
an inner stent frame configured to expand from a collapsed configuration to an expanded configuration;
an outer anchor assembly coupled to and disposed radially outward of the inner stent frame, the outer anchor assembly configured to expand from a collapsed configuration to an expanded configuration, the outer anchor assembly including an atrial anchor at an inflow end of the prosthetic heart valve, a ventricular anchor at an outflow end of the prosthetic heart valve, and a central waist portion disposed between the atrial and ventricular anchors,
wherein in the expanded configuration of the outer anchor assembly, the central waist portion is concave along an outer surface of the outer anchor assembly;
an outer skirt disposed radially outward of the outer anchor assembly,
wherein in the expanded configuration of the outer anchor assembly, the outer skirt includes a convex protrusion around an outer surface of the outer skirt, the convex protrusion axially aligned with the concave central waist portion of the outer anchor assembly, wherein the outer skirt has a first contour length extending from an inflow edge of the outer skirt to an outflow edge of the outer skirt, and the outer anchor assembly has a second contour length extending from an inflow edge of the outer anchor assembly to an outflow edge of the outer anchor assembly, the first contour length being equal to the second contour length; and
a plurality of prosthetic leaflets coupled to an inner circumference of the inner stent frame, the plurality of prosthetic leaflets adapted to allow unidirectional flow of blood through the prosthetic heart valve.

2. The prosthetic heart valve of claim 1, wherein the atrial anchor is adapted to be disposed on an atrial side of a native valve annulus and the ventricular anchor is adapted to be disposed on a ventricular side of the native valve annulus, the outer anchor assembly forming a shape configured to sandwich the native valve annulus between the atrial and ventricular anchors.

3. The prosthetic heart valve of claim 1, wherein in the collapsed configuration of the outer anchor assembly, the outer skirt lays flat against the outer anchor assembly.

4. The prosthetic heart valve of claim 1, wherein the outer skirt is formed of polyethylene terephthalate (PET) or ultra-high-molecular-weight polyethylene (UHMWPE).

5. The prosthetic heart valve of claim 1, wherein the concave central waist portion includes a transition portion that connects the concave central waist portion to a ventricular portion of the valve, and the convex protrusion of the outer skirt is disposed at the transition portion.

6. The prosthetic heart valve of claim 5, wherein the convex protrusion protrudes radially outwardly from the transition portion.

7. The prosthetic heart valve of claim 5, wherein the convex protrusion protrudes axially toward the inflow end and radially outwardly from the transition portion.

8. The prosthetic heart valve of claim 1, wherein the skirt is coupled to the outer anchor assembly at two points of contact at a transition portion where the anchor assembly contours radially outward from the central waist to the ventricular anchor.

9. The prosthetic heart valve of claim 1, wherein the outer anchor assembly includes a plurality of tines extending from the ventricular anchor,
wherein, in the expanded configuration of the outer anchor assembly, the outer skirt extends toward the outflow end to cover a portion of a terminal outflow row of cells and extends beyond the tines such that the tines extend through the outer skirt.

10. The prosthetic heart valve of claim 1, wherein the convex protrusion is configured to seal a space between the prosthetic heart valve and surrounding tissue of a native valve annulus when the prosthetic heart valve is implanted in the native valve annulus to prevent paravalvular leakage (PVL).

11. A prosthetic heart valve comprising:
an inner stent frame configured to expand from a collapsed configuration to an expanded configuration;
an outer anchor assembly coupled to and disposed radially outward of the inner stent frame, the outer anchor assembly configured to expand from a collapsed configuration to an expanded configuration, the outer anchor assembly including an atrial anchor at an inflow end of the prosthetic heart valve, a ventricular anchor at an outflow end of the prosthetic heart valve, and a central waist portion disposed between the atrial and ventricular anchors,
wherein in the expanded configuration of the outer anchor assembly, the central waist portion is concave along an outer surface of the outer anchor assembly;
an outer skirt disposed radially outward of the outer anchor assembly,
wherein in the expanded configuration of the outer anchor assembly, the outer skirt is shape-set so as to include a convex protrusion around an outer surface of the outer skirt in the absence of applied forces, the convex protrusion axially aligned with the concave central waist portion of the outer anchor assembly, wherein an inner surface of the convex protrusion is concave, wherein the outer skirt has a first contour length extending from an inflow edge of the outer skirt to an outflow edge of the outer skirt, and the outer anchor assembly has a second contour length extending from an inflow edge of the outer anchor assembly to an outflow edge of the outer anchor assembly, the first contour length being equal to the second contour length; and a plurality of prosthetic leaflets coupled to an inner circumference of the inner stent frame, the plurality of prosthetic leaflets adapted to allow unidirectional flow of blood through the prosthetic heart valve.

12. The prosthetic heart valve of claim 11, wherein the outer anchor assembly includes a plurality of tines extending from the ventricular anchor, wherein, in the expanded configuration of the outer anchor assembly, the outer skirt extends toward the outflow end to cover a portion of a terminal outflow row of cells and extends beyond the tines such that the tines extend through the outer skirt.

13. The prosthetic heart valve of claim 11, wherein the convex protrusion is configured to seal a space between the prosthetic heart valve and surrounding tissue of a native valve annulus when the prosthetic heart valve is implanted in the native valve annulus to prevent paravalvular leakage (PVL).

14. A prosthetic heart valve comprising:

an inner stent frame configured to expand from a collapsed configuration to an expanded configuration;

an outer anchor assembly coupled to and disposed radially outward of the inner stent frame, the outer anchor assembly configured to expand from a collapsed configuration to an expanded configuration, the outer anchor assembly including an atrial anchor at an inflow end of the prosthetic heart valve, a ventricular anchor at an outflow end of the prosthetic heart valve, and a central waist portion disposed between the atrial and ventricular anchors, wherein in the expanded configuration of the outer anchor assembly, the central waist portion is concave along an outer surface of the outer anchor assembly;

an outer skirt disposed radially outward of the outer anchor assembly, wherein in the expanded configuration of the outer anchor assembly, the outer skirt includes a convex protrusion around an outer surface of the outer skirt, the convex protrusion axially offset from the concave central waist portion of the outer anchor assembly such that the convex protrusion is closer to the ventricular anchor than the atrial anchor, wherein the protrusion extends axially toward the atrial anchor at the inflow end and the skirt is coupled to the outer anchor assembly at two points of contact at a transition portion where the anchor assembly contours radially outward from the central waist to the ventricular anchor, wherein the outer skirt has a first contour length extending from an inflow edge of the outer skirt to an outflow edge of the outer skirt, and the outer anchor assembly has a second contour length extending from an inflow edge of the outer anchor assembly to an outflow edge of the outer anchor assembly, the first contour length being equal to the second contour length; and a plurality of prosthetic leaflets coupled to an inner circumference of the inner stent frame, the plurality of prosthetic leaflets adapted to allow unidirectional flow of blood through the prosthetic heart valve.

15. The prosthetic heart valve of claim 14, wherein the outer anchor assembly includes a plurality of tines extending from the ventricular anchor, wherein, in the expanded configuration of the outer anchor assembly, the outer skirt extends toward the outflow end to cover a portion of a terminal outflow row of cells and extends beyond the tines such that the tines extend through the outer skirt.

16. The prosthetic heart valve of claim 14, wherein the convex protrusion is configured to seal a space between the prosthetic heart valve and surrounding tissue of a native valve annulus when the prosthetic heart valve is implanted in the native valve annulus to prevent paravalvular leakage (PVL).

* * * * *